US00RE37276E

(19) United States
(12) Reissued Patent
Lantto

(10) Patent Number: US RE37,276 E
(45) Date of Reissued Patent: Jul. 10, 2001

(54) METHOD AND ARRANGEMENT FOR HANDLING A MOBILE TELEPHONE SUBSCRIBER ADMINISTERED IN DIFFERENT MOBILE TELEPHONE NETWORKS WITH A COMMON CALL NUMBER

(75) Inventor: Jörgen Lantto, Stockholm (SE)

(73) Assignee: Telefonaktiebolaget LM Ericsson (publ), Stockholm (SE)

(21) Appl. No.: 09/060,149

(22) Filed: Apr. 15, 1998

Related U.S. Patent Documents

Reissue of:
(64) Patent No.: 5,610,974
Issued: Mar. 11, 1997
Appl. No.: 08/417,023
Filed: Apr. 5, 1995

(51) Int. Cl.[7] ..... H04Q 7/38
(52) U.S. Cl. ..... 455/433
(58) Field of Search ..... 455/433; 370/331

(56) References Cited

U.S. PATENT DOCUMENTS

| | | | |
|---|---|---|---|
| 4,670,905 | 6/1987 | Sandvos et al. . | |
| 4,737,978 | 4/1988 | Burke et al. . | |
| 4,901,340 | 2/1990 | Parker et al. . | |
| 5,090,050 | 2/1992 | Heffernan . | |
| 5,610,974 * | 3/1997 | Lantto | 455/433 |

FOREIGN PATENT DOCUMENTS

| | | |
|---|---|---|
| 0 512 962 | 11/1992 | (EP) . |
| 89/07380 | 8/1989 | (WO) . |
| 94/01978 | 1/1994 | (WO) . |

OTHER PUBLICATIONS

Network Architecture GSM 03.02, Jan. 15, 1990.
Mobile Application Part GSM 09.02, Jan. 1991, pp. 9, 20–26, 32, 33, 52–54, 56–60,62–65,81,82,87,88,91–93, 103–108,429,438, 440, and 463–465.
TTC, JJ/70.10 Ver., Mobile Application Part (MAP) Signalling System, 3, 1994, pp. 1–157, 173–189, and 209–520.
Nelson et al., "The North American Cellular Network", Ericsson Review No. 4, 1991.
Synacom Technology DCS–1900/IS–41 RoamFree™ Gateway System Requirements, Version 0.3, May 23, 1995.

* cited by examiner

*Primary Examiner*—William Cumming
(74) *Attorney, Agent, or Firm*—Burns, Doane, Swecker & Mathis, L.L.P.

(57) ABSTRACT

A roaming arrangement enables roaming between different types of networks in a telecommunication system that includes a first standardized type of mobile network, a so-called home network, and a second standardized type of mobile network, a so-called guest network. A subscriber has an identity that is common for both the home network and the guest network. The roaming arrangement includes a signal handling arrangement, at least one home interface towards the home network, and at least one guest interface towards the guest net. A first signalling format between the arrangement and the home network is of the same type as a corresponding format in the home network. Also, a second signalling format between the arrangement and the guest network is of the same type as a corresponding format in the guest network.

38 Claims, 12 Drawing Sheets

METHOD AND ARRANGEMENT FOR HANDLING A MOBILE TELEPHONE SUBSCRIBER ADMINISTERED IN DIFFERENT MOBILE TELEPHONE NETWORKS WITH A COMMON CALL NUMBER

Matter enclosed in heavy brackets [ ] appears in the original patent but forms no part of this reissue specification; matter printed in italics indicates the additions made by reissue.

BACKGROUND

The present invention relates to an arrangement for handling a mobile telephone subscriber which is administered in at least two different standardized mobile telephone networks with a call number which is common to both of the at least two networks. The invention also relates to methods of procedure when handling the subscriber.

It has long been known in mobile telephony to register the position of a mobile subscriber automatically when the mobile has moved between different mobile telephone networks. This type of automatic mobile registration is called roaming. For instance, it is possible within a GSM system extending over several European countries to use a mobile unit while moving from one country to another, without needing to register the new positions of the mobile manually. When the mobile is switched on after having moved from one place to another, the position of the mobile is registered automatically. Once the position of the mobile has been registered, it is again possible to receive calls and to call other subscribers. A mobile telephone system which includes different subsystems is known, for instance, from International Patent Application WO 89/07380. The system includes a main computer which is able to communicate with different local computers, each of which is located in one of the subsystems. The main computer therewith obtains information as to where mobile units are located in the total system. Calls can be set-up to the mobile units, with the aid of the information contained in the main computer. One serious drawback with present-day techniques, is that automatic updating of the position of a mobile unit after the unit has moved to another location requires the move to be made within the same type of standardized mobile telecommunications system, for instance GSM. It is not possible in present-day techniques to transport information automatically from one type of mobile telecommunications system, for instance GSM, to another type of mobile telecommunications system, for instance the Japanese PDC system. A decisive factor is that different types of mobile telecommunications systems communicate internally through the medium of different types of standardized signalling procedures. A Global System for Mobile communication (GSM) and Personal Digital Cellular (PDC) are examples of mobile telecommunications systems in which roaming within the system is available. Roaming in the GSM system is described in European Digital Cellular Communication System; Network architecture GSM 03.02 and Mobile application part GSM 09.02. Roaming in the PDC system is described in the standard TTC JJ/70.10, Ver 3.

SUMMARY

The present invention is concerned with the problem of handling a mobile subscriber which is administered with the same call number or some other identification sign in at least two different standardized types of mobile telecommunication networks. For instance, a calling subscriber wishes to be able to call a mobile with the same call number irrespective of the network in which the mobile is located.

This is made possible in accordance with the invention in that the different networks are mutually connected via a roaming arrangement which is able to communicate with several different standardized types of network.

The above problem is also solved in accordance with the invention by means of the inventive procedural methods, such that after moving between the networks, the subscriber will have access to the same services as those that were available prior to making the move.

Thus, one object of the present invention is to enable a subscriber to obtain the same type of services in at least two different standardized types of network. Another object of the invention is to register the position of a subscriber who has moved from a first type of network to a second type of network. Still another object is to again request position registration in the event of an error which results in the erasure of earlier obtained information. Yet another object of the invention is to enable calls to be made to a subscriber who has moved from the first type of network to the other type of network. Still another object of the invention is to handle subscriber supplementary services, for instance by initiating a call transfer service after the subscriber has moved between said networks. Yet another object of the invention is to de-register a subscriber who has returned from the second type of network to the first type of network.

The roaming arrangement includes signal interfaces towards at least one first standardized type of network, these interfaces being such that the roaming arrangement will be recognized as being a part of the first network, in accordance with the invention. The roaming arrangement also includes interfaces towards at least one second standardized type of network, these interfaces being such that the roaming arrangement will be recognized as being a part of the second network, in accordance with the invention. The inventive methods of procedure include reading information into and out of the roaming arrangement from/to both the first and the second standardized types of networks. The procedures also include the transfer of data between the networks involved.

The invention enables registration of the position of a subscriber after the subscriber has moved from the first standardized type of network to the second standardized type of network. This is a significant advantage over earlier known techniques, which solely enable the position of a subscriber to be registered after the subscriber has moved within one standardized type of mobile telecommunications network. Another advantage afforded by the invention is that the same types of service can be obtained both before and after moving between different standardized types of network.

The invention will now be described in more detail with reference to preferred embodiments thereof and also with reference to the accompanying drawings.

DETAILED DESCRIPTION

Figure 1:
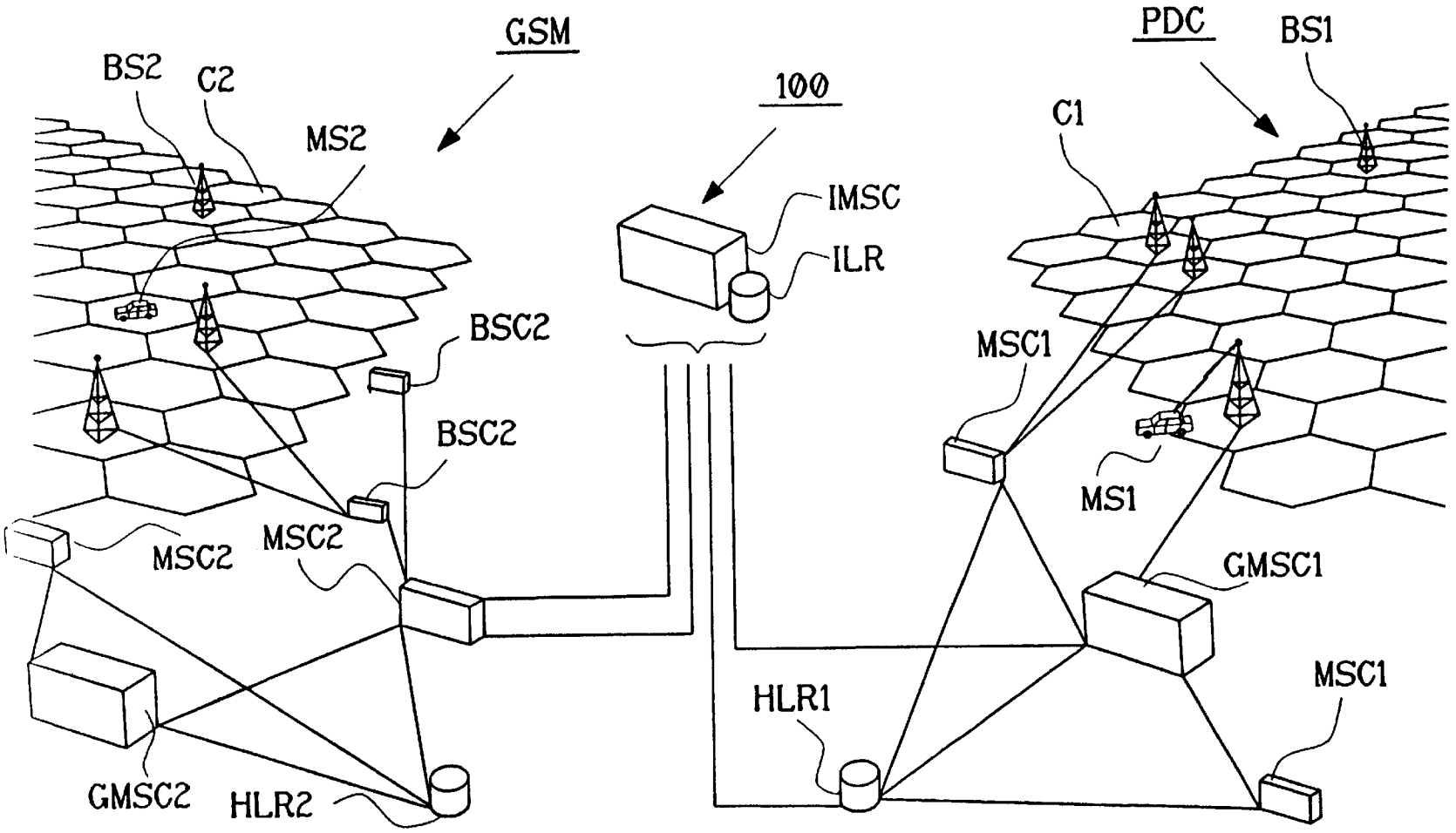
FIG. 1 illustrates in perspective a telecommunications system which includes a first type of standardized network and a second type of standardized network.

FIG. 1 illustrates a PDC-type mobile telecommunications network (Personal Digital Cellular). The mobile telecommunications network PDC, hereinafter referred to as the home network PDC, includes a plurality of mobile telephone switching centres MSC1. Each switching centre is connected to a plurality of base stations BS1, each of which monitors a geographic area that includes one or more cells C1. One of the switching centres is called the call switching centre GMSC1. The term call switching centre will be explained further on. In the embodiment shown in FIG. 1, the home network PDC also includes a central database, a so-called home location register HLR1, which in this case is connected to all switches GMSC1 and MSC1 within the home network PDC.

FIG. 1 also shows a GSM-type mobile telecommunications network (Global System for Mobile communication). The mobile telecommunications network GSM, which is hereinafter called the guest network GSM, includes a plurality of mobile telephone switching centres MSC2, similar to the home network PDC. In the FIG. 1 illustration, each switching centre is connected to a plurality of base control units BSC2, each of which is connected to base stations BS2 which monitor a geographic area that includes one or more cells C2. Similar to the home network PDC, the guest network GSM includes a call switching centre GMSC2 and a central database, a so-called home location register HLR2, which in this case is connected to all switching centres GMSC2 and MSC2 in the guest network GSM. It will be understood that the units shown in the home network PDC and in the guest network GSM in FIG. 1 are merely a few of the total number of units that are normally included in such networks. Correspondingly, only a part of the total number of connections that normally exist in the networks PDC and GSM have been marked in FIG. 1. FIG. 1 merely shows the units in the home network PDC and in the guest network GSM that are necessary to obtain an understanding of the invention. The multiples of units that exist in a complete telecommunications system have been excluded from the Figure for reasons of clarity. The PDC network is well specified in the standard TTC JJ/70.10, Ver 3, while the GSM network is specified in European Digital Cellular Communication System; Network architecture GSM 03.02. FIG. 1 also shows an inventive roaming arrangement 100 whose function will be described in more detail with reference to FIG. 2.

Figure 2:
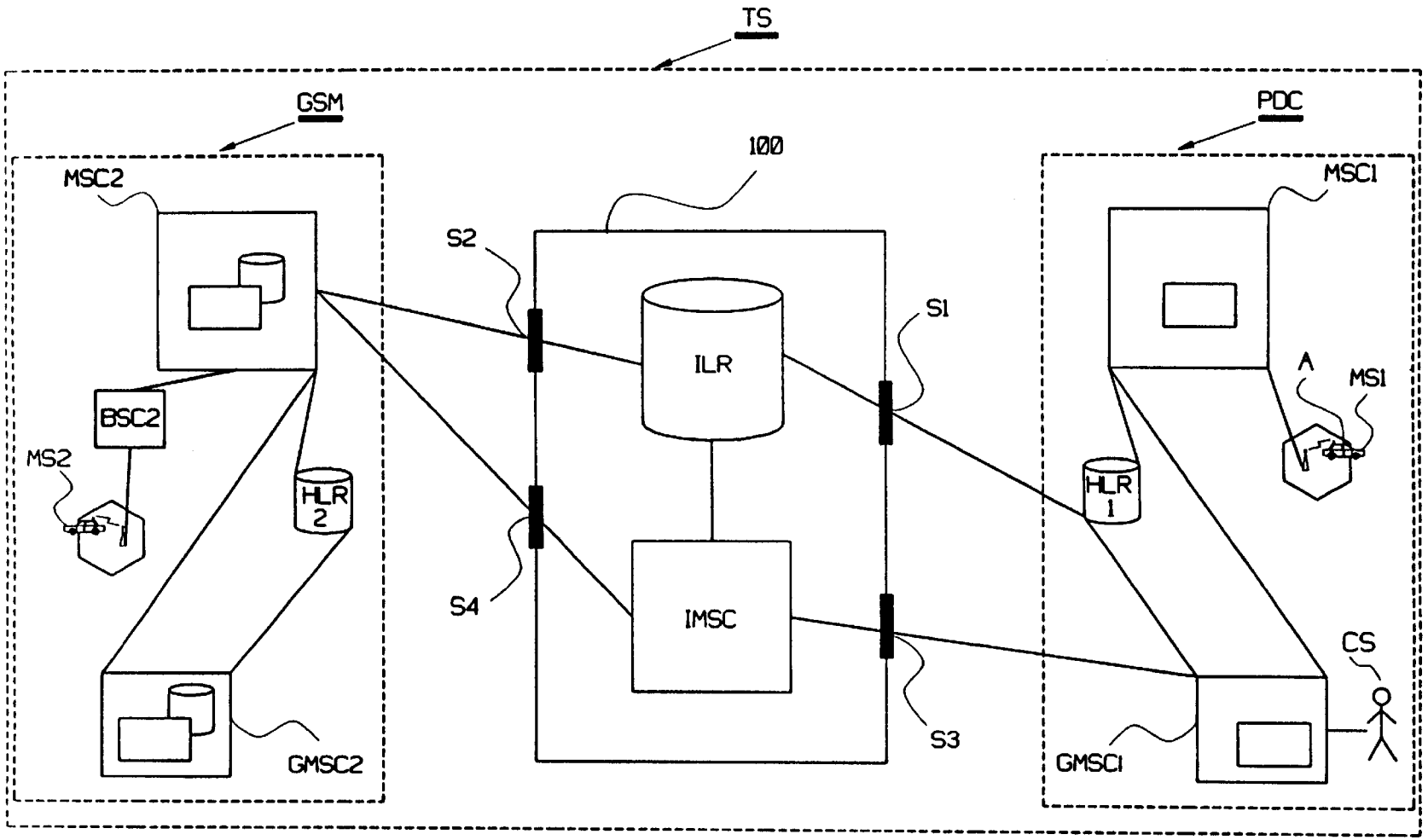
FIG. 2 illustrates schematically a telecommunications system which includes an inventive roaming arrangement, a first type of standardized network, and a second type of standardized network.

FIG. 2 illustrates schematically a telecommunications system TS which includes both the home network PDC and the guest network GSM. The home network PDC includes the mobile telephone switching centre MSC1, which is also referred to as a PDC local switching centre. The PDC local switching centre handles signalling to and from mobile units MS1 that are located temporarily in one of the cells handled by the PDC local switching centre MSC1. The home network PDC includes the call switching centre GMSC1, which is also referred to as a PDC call switching centre. The call switching centre GMSC1 is the same type of switching centre as the earlier mentioned PDC local switching centre MSC1. The local switching centre MSC1 temporarily obtains the designation PDC call switching centre GMSC1 when the local switching centre receives as the first switching centre in the network a call from a calling subscriber CS to a called subscriber, for instance the subscriber A in the mobile MS1. The calling subscriber CS is only formally marked in FIG. 2, without the Figure showing all of the telecommunication units that are necessary for the call. The term "call switching centre" in distinction to the term "local switching centre" as used here is only meant to provide assistance in clarifying the following description. The home register HLR1, which is also referred to as a PDC home register, is connected to both the mobile telephone switching centres MSC1 and GMSC1 in the home network PDC. All subscribers that have their home subscription in the home network are registered in the PDC home register, i.e. those subscribers that have subscribed to the network operator that handles the home network, and who therewith have the right to use the network.

The guest network GSM also includes the mobile telephone switching centre MSC2, which is also referred to as a GSM local switching centre MSC2. The switching centre MSC2 handles, via the base control unit BSC2, signalling to and from mobile units MS2 which are located temporarily in one of the cells handled by the GSM local switching centre MSC2. A subscriber using the mobile unit MS2 is registered temporarily in a guest register in the GSM local switching centre MSC2 whilst the mobile unit MS2 is located in the cell area handled by the GSM switching centre MSC2. The guest network GSM also includes the call switching centre GMSC2, which is also referred to as a GSM call switching centre, the function of which in the guest network GSM is the same as the function of the earlier mentioned PDC call switching centre in the home network PDC. The home register, a so-called GSM home register HLR2, is connected to both of the mobile telephone switching centres MSC2 and GMSC2 in the guest network GSM. All subscribers that have their home subscription in the guest network are registered in the GSM home register, i.e. those subscribers who have subscribed to the operator that handles the guest network and who therewith have the right to use the network.

Respective home registers HLR1 and HLR2 in the home network PDC and the guest network GSM obtain from respective local switching centres MSC1 and MSC2 information relating to subscribers who are temporarily located in the cell areas of respective switching centres. The signalling procedure applied between the PDC home register HLR1 and the PDC local switching centre MSC1 to transport data between the PDC home register HLR1 and the PDC local switching centre MSC1 is defined in the standard Internode Specification for Digital Mobile Communications Network—Ver. 4.0. This signalling procedure will be used further on in the text as a comparison when explaining the signalling procedure between the roaming arrangement and the home network PDC. The signalling procedure applied between the GSM home register and the GSM local switching centre MSC2 to transport data between the GSM home register HLR2 and the GSM local switching centre MSC2 is defined in GSM recommendation 09.02. This signalling procedure will be used further on in the text as a comparison when explaining the signalling procedure between the roaming arrangement and the guest network GSM. A brief explanation will now be given of the signalling procedure that takes place when a call is made to a PDC subscriber, for instance the subscriber A located within the PDC network, in the illustrated case the mobile MS1. When a call from the calling subscriber CS to the subscriber A who is registered as a home subscriber in the PDC network arrives at the call switching centre GMSC1 of the PDC network, the PDC call switching centre GMSC1 asks the PDC home register HLR1 for information relating to the PDC local switching centre MSC1 in which the called subscriber is registered at that moment in time. Upon receipt of an answer to this query, the call is directed from the PDC call switching centre GMSC1 to the PDC local switching centre MSC1 given by the PDC home register in reply to the query. The signalling procedure used between the PDC call switching centre GMSC1 and the PDC local switching centre MSC1 when directing the call from the PDC call switching centre GMSC1 to the PDC local switching centre MSC1 is defined in the standard Internode Specification for Digital Mobile Communications Network—Ver. 4.0. This signalling procedure will be used further on as a comparison when explaining the signalling procedure carried out between the roaming arrangement 100 and the home network PDC. The signalling procedure described with reference to the PDC network also applies when a call is made in the GSM network The signalling procedure which is then used between the GSM call switching centre GMSC2 and the GSM local switching centre MSC2 is defined in European Digital Cellular Communication System; Routing of calls to mobile subscriber GSM 03.04. This signalling procedure will be used further on in the text as a comparison when explaining the signalling procedure carried out between the roaming arrangement and the guest network GSM.

The telecommunications system TS also includes the inventive roaming arrangement 100, which has been described above with reference to FIG. 1. The roaming arrangement 100 includes a roaming register ILR and a roaming switching centre IMSC. The roaming arrangement 100 is connected to the home network through the medium of a home interface S1, S3, and also to the guest network through the medium of a guest interface S2, S4. These interfaces will be described in more detail below. All roaming subscribers, for instance the subscriber A, who have their roaming subscription in the guest network are administered in the Roaming register ILR, i.e. those subscribers who already have a home subscription in the home network PDC and who have subscribed to a roaming subscription with the operator that handles the guest network GSM. These roaming subscribers therewith have the right to use both the home network PDC and the guest network GSM. In the case of the illustrated embodiment, the roaming arrangement is administered by the operator which handles the guest network GSM, although it is, of course, also feasible for the roaming arrangement to be administered by the networkoperator which handles the home network. It is also conceivable for the roaming arrangement to be administered by an independent network operator a so-called roaming operator. The roaming subscriber A is administered with the call number in both networks, i.e. according to one inventive method, the calling subscriber CS is able to call the roaming subscriber A on the same telephone number irrespective of whether the subscriber A is located in the home network or in the guest network. This will be explained in more detail below. The roaming register ILR is connected to both the home network PDC and to the guest network GSM. That part of the roaming register ILR which handles signalling between the roaming register ILR and the home register HLR1 in the home network PDC is named a first interface S1 in the home interface, while that part of the roaming register ILR which handles signalling between the roaming register ILR and the local switching centre MSC2 in the guest network GSM is named a second interface S2 in the guest interface. According to the invention, the signalling procedure used via the first interface S1 between the PDC home register HLR1 and the roaming register ILR is the same type of signalling procedure as that used between the PDC home register HLR1 and the PDC local switching centre MSC1, this signalling procedure having been mentioned earlier on in the text. The PDC home register HLR1 herewith recognizes the roaming arrangement 100 as being a local switching centre in the home network. According to the invention, the signalling procedure used via the second interface S2 between the GSM local switching centre MSC2 and the roaming register ILR is the same type of signalling procedure as that used between the GSM local switching centre MSC2 and the GSM home register HLR2, this signalling procedure having been mentioned earlier on in the text. The GSM local switching centre MSC2 herewith recognizes the roaming arrangement 100 as being a home register in the guest network GSM. According to the invention, the roaming register ILR can therewith be handled from both the home network PDC and the guest network GSM, and is recognized as a part of the, own network by the PDC and GSM networks. The advantage gained in this respect will be made apparent further on, when describing the inventive methods of procedure. In addition to being connected to the roaming register ILR, the roaming switching centre IMSC is also connected to the home network PDC and to the guest network GSM. That part of the roaming switching centre IMSC which handles signalling between the roaming switching centre IMSC and the call switching centre GMSC1 in the home network PDC is named a third interface S3 in the home interface, while that part of the roaming switching centre IMSC which handles signalling between the roaming switching centre IMSC and the local switching centre MSC2 in the guest network GSM is named a fourth interface S4 in the guest interface. According to the invention, the signalling procedure used via the third interface S3 between the PDC call switching centre GMSC1 and the roaming switching centre IMSC is of the same type of signalling procedure as that used between the call switching centre GMSC1 and the PDC local switching centre MSC1, this signalling procedure having been mentioned earlier on in the text. The PDC call switching centre GMSC1 herewith recognizes the roaming arrangement 100 as being a local switching centre MSC1 in the home network PDC. According to the invention, the signalling procedure used via the fourth interface S4 between the GSM local switching centre MSC2 and the roaming switching centre IMSC is the same type of procedure as that used between the GSM local switching centre MSC2 and the GSM call switching centre GMSC2, this signalling procedure having been mentioned earlier on in the text. The GSM local switching centre MSC2 herewith recognizes the roaming arrangement 100 as being a call switching centre in the guest network GSM. According to the invention, the roaming switching centre IMSC can therewith be handled from both the home network PDC and the guest network GSM and is recognized by both networks PDC and GSM as a part of the own network. The advantage gained by this will be made apparent further on in the description, when describing the inventive methods of procedure.

Figure 3:
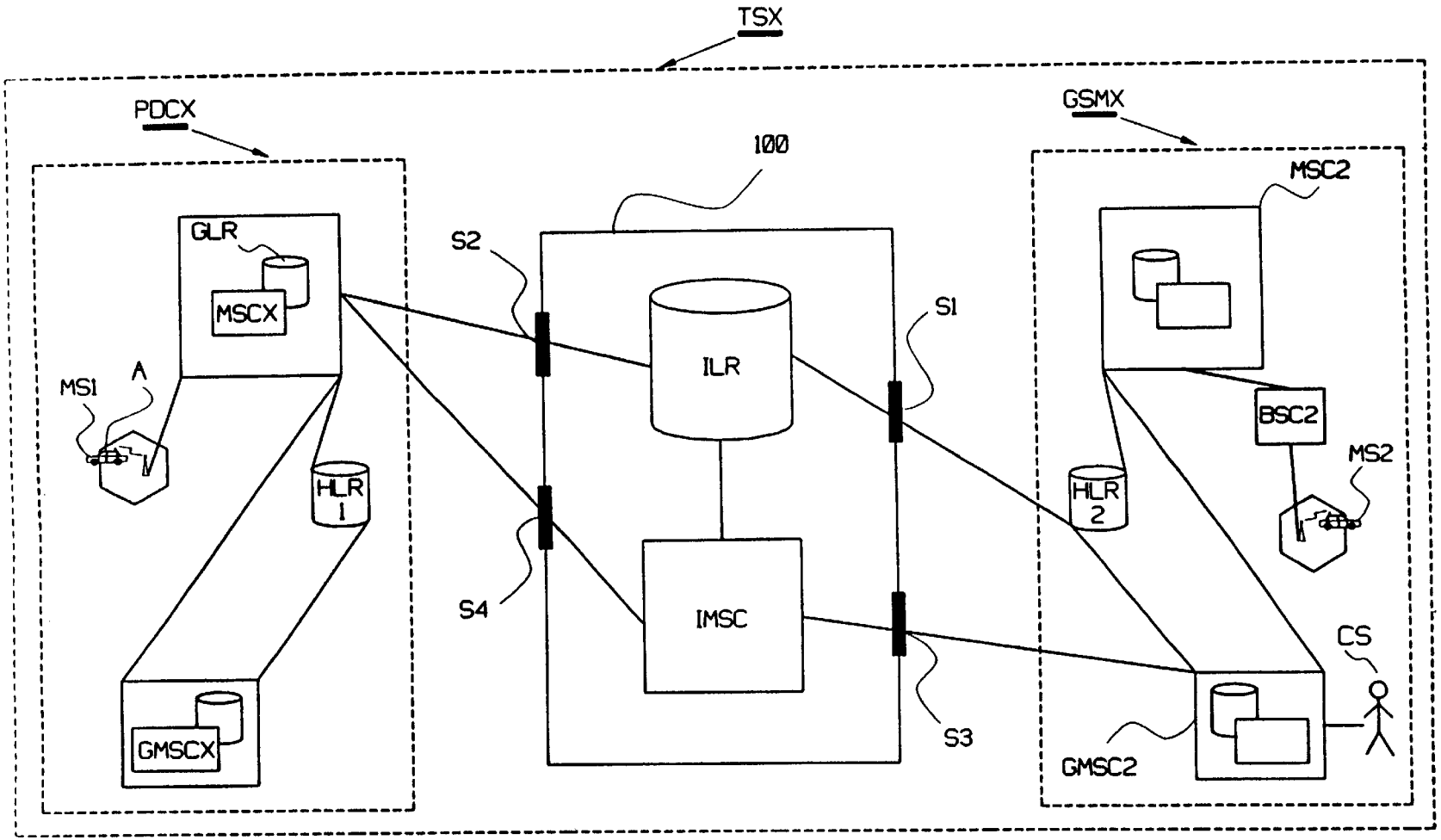
FIG. 3 illustrates schematically a telecommunications system which includes an inventive roaming arrangement, a first type of standardized network and a second type of standardized network.

It will be understood that those connections illustrated in the exemplifying embodiment between the roaming arrangement 100 and the two respective networks PDC and GSM are only examples of such connections. Of course, one skilled in this art will readily understand that the roaming arrangement 100 will also function in the case illustrated in FIG. 3, in which the home network GSMX is a GSM-type network and the guest network PDCX is a PDC-type network, or in those cases where the mixed networks are of a standardized type other than those described above. It should be pointed out that some standardized networks may have a configuration that differs slightly from the illustrated case. For instance, a PDC-type mobile telephone network may be configured in various ways, depending on the PDC standard that has been used when implementing the network. An example of one configuration of a PDC-type mobile telephone network is when a PDC local switching centre MSCX communicates with the PDC home register HLR1 via a guest location register GLR. Another example of a PDC network configuration is when the PDC local switching centre PDCX communicates directly with the PDC home register HLR1 without using an intermediate guest location register. It will be evident to one of normal skill in this art that a roaming arrangement 100 which borders a standardized PDC-type network will include an interface which is adapted to the standard applicable to the network. When a PDC-type mobile telephone network acts as a guest network PDCX, as in the case illustrated in FIG. 3, and includes local switching centres of the first type, the guest register GLR will communicate in the PDC network with the roaming arrangement 100. When a PDC-type mobile telephone network acts as a guest network PDCX and includes local switching centres of the second type, as is also marked in FIG. 3, the local switching centre MSCX in the PDC network will, on the other hand, communicate directly with the roaming arrangement 100. On the other hand, when a PDC-type mobile telephone network acts as a home network and includes local switching centres of the first type, the roaming arrangement 100 will be recognized by a PDC home register HLR1 as a guest register. When a PDC-type mobile telephone network acts as a home network and includes local switching centres of the second type, as shown in FIG. 2, the PDC register will recognize the roaming arrangement 100 as being a local switching centre. The various network standards that can arise when practicing the invention shall be seen solely as different embodiments of the invention. These configurations are not considered to have a limiting effect on how the invention can be practiced and do not detract from the inventive concept in any way.

Figure 4:
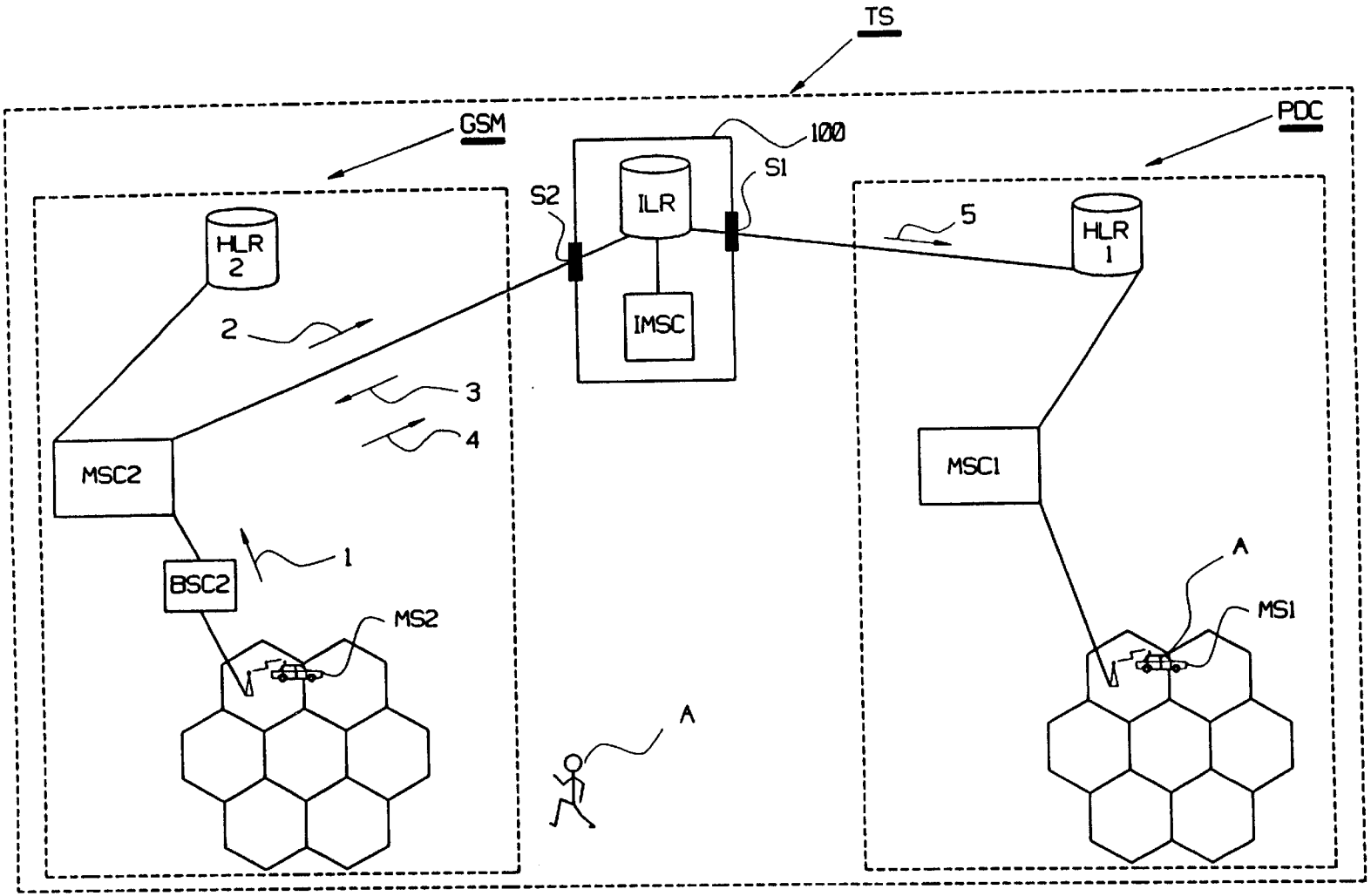
FIG. 4 illustrates schematically a telecommunications system which includes an inventive roaming arrangement, a first type of standardized network, and a second type of standardized network. The Figure illustrates the signalling procedure that is carried out in accordance with one registration procedure.

FIG. 4 illustrates schematically those units which have earlier been described with reference to FIG. 2 and which are significant to an inventive method which will now be described. All fixed connections between the earlier enumerated signalling nodes, i.e. base stations, base control unit, local switching centres, home register and roaming register have been illustrated in thick full lines in FIG. 4. Naturally, signalling between the nodes, which will be described in detail further on, takes place over the fixed connections, but has been shown in the Figure on one side of these connections for the sake of clarity. Signalling is indicated by thin full arrows which show the signalling directions. The signalling illustrated in the Figure and necessary to the invention does not claim to be the full signalling procedure that is carried out when handling a subscriber registered in two different types of standardized network. Signalling that is considered to form part of well known techniques is not described in the text nor shown in detail in the Figure. The localizing procedure described in the following illustrates the procedure taken to register the location of the roaming subscriber A after the subscriber has moved from the home network PDC to the guest network GSM. The roaming subscriber A is administered with the same call number in both networks, i.e. the roaming subscriber A can be reached by the aforesaid calling subscriber CS on one and the same telephone number, irrespective of the network in which the roaming subscriber A is located. The roaming subscriber A is herewith registered permanently in the home register HLR1 as being domestic in the home network PDC. The roaming subscriber A is also registered permanently in the roaming register ILR as a conceivable guest in the guest network GSM. In the illustrated case, the roaming subscriber A has access to two different mobile telecommunications units, wherein the first mobile is located in the home network PDC and is designated a PDC mobile MS1. The second unit is located in the guest network GSM and is designated a GSM mobile MS2. The PDC mobile MS1 is adapted to the home network PDC, i.e. adapted to communicate with base stations in the home network through the medium of an air interface. The air interface is marked in FIG. 1 by a lightning symbol between the PDC mobile MS1 and a base station. The GSM mobile MS2 is adapted to the guest network in the same way. Both mobile units MS1 and MS2 include a subscriber module read means. The subscriber module, which is often referred to as a SIM card, is a card about the size of a standard credit card for instance, and contains information relating to the owner of the card, i.e. the roaming subscriber A in the case of the illustrated embodiment. When the SIM card is inserted into the mobile unit MS1 in the home network PDC, there is initiated a registration process whose purpose is to confirm the authority of the subscriber in the home network and to register the location of the subscriber in the network. This process is well known to the person skilled in this art and has not therefore been shown in FIG. 4 or described in detail in the text. Briefly, the process comprises the following two steps, of which the first step shows the authority check and the second check shows the registration:

The PDC local switching centre MCS1 in whose cell area the mobile telephone subscriber A is located asks the PDC home register HLR1 for information on which it can carry out an authority check. The PDC home register HLR1 collects authority information from an authorization register in the home network PDC. The PDC home register HLR1 forwards the information to the PDC local switching centre, which then carries out an authorization check.

When the check has been accepted, the PDC home register HLR1 is informed by the PDC local switching centre MSC1 that the mobile telephone subscriber A is located within the cell area of the PDC local switching centre and that the subscriber is authorized. The location of the subscriber is then registered in the PDC home register HLR1.

The inventive method of procedure which will now be described with reference to FIG. 4 is concerned with a localizing procedure that is undertaken when the aforesaid roaming subscriber A has moved and is located in the guest network GSM in a cell handled by the GSM local switching centre MSC2. The subscriber A uses the GSM mobile MS2. The method includes the following steps:

The reader in the GSM mobile MS2 reads the SIM card.

An updating request 1 is sent from the GSM mobile MS2 to the GSM local switching centre MSC2, via the base control unit BSC2.

The updating request 1 includes the identity of the subscriber A. With the aid of the identity of the roaming subscriber A, the GSM local switching centre MSC2 establishes that the subscriber is registered permanently in the roaming register ILR.

The GSM local switching centre MSC2 sends to the roaming register ILR an information request 2, in which information needed to check the authorization of the subscriber is requested by the GSM local switching centre MSC2.

An information response 3 is sent from the roaming register ILR to the GSM local switching centre MSC2, wherewith the necessary information is sent to the GSM local switching centre MSC2.

The authorization of the subscriber A as a guest in the guest network is checked in the GSM local switching centre MSC2.

This checking procedure is less important to the invention and has not therefore been described in detail. The procedure is the same as the checking procedure that is normally carried out in a GSM network in order to check subscriber authorization and is considered to be well known to one skilled in this art.

The roaming subscriber A is accepted as a guest in the guest network GSM.

The GSM local switching centre MSC2 sends an initiation message 4 to the roaming register ILR, this message containing information of the whereabouts of the roaming subscriber A in a cell area handled by the GSM local switching centre MSC2.

The new position of the subscriber A is registered in the roaming register ILR, i.e. the GSM local switching centre MSC2 in the guest network GSM.

A registration message 5 is sent from the roaming register ILR to the PDC home register HLR1 in the home network PDC, this message 5 containing an address to the roaming register ILR. This information can be later used when connecting a call for instance, as will be made apparent further on.

Subscriber data relating to the roaming subscriber A is updated in the PDC home register (HLR1), the address of the roaming register ILR being included in the subscriber data.

As before mentioned, the aforedescribed signalling procedure is not the full signalling procedure that is carried out when registering a roaming subscriber A who has moved from a home network to a guest network. Only signalling that is essential to the invention has been described, while other signalling is considered to be well known to one of normal skill in this art.

Figure 5:
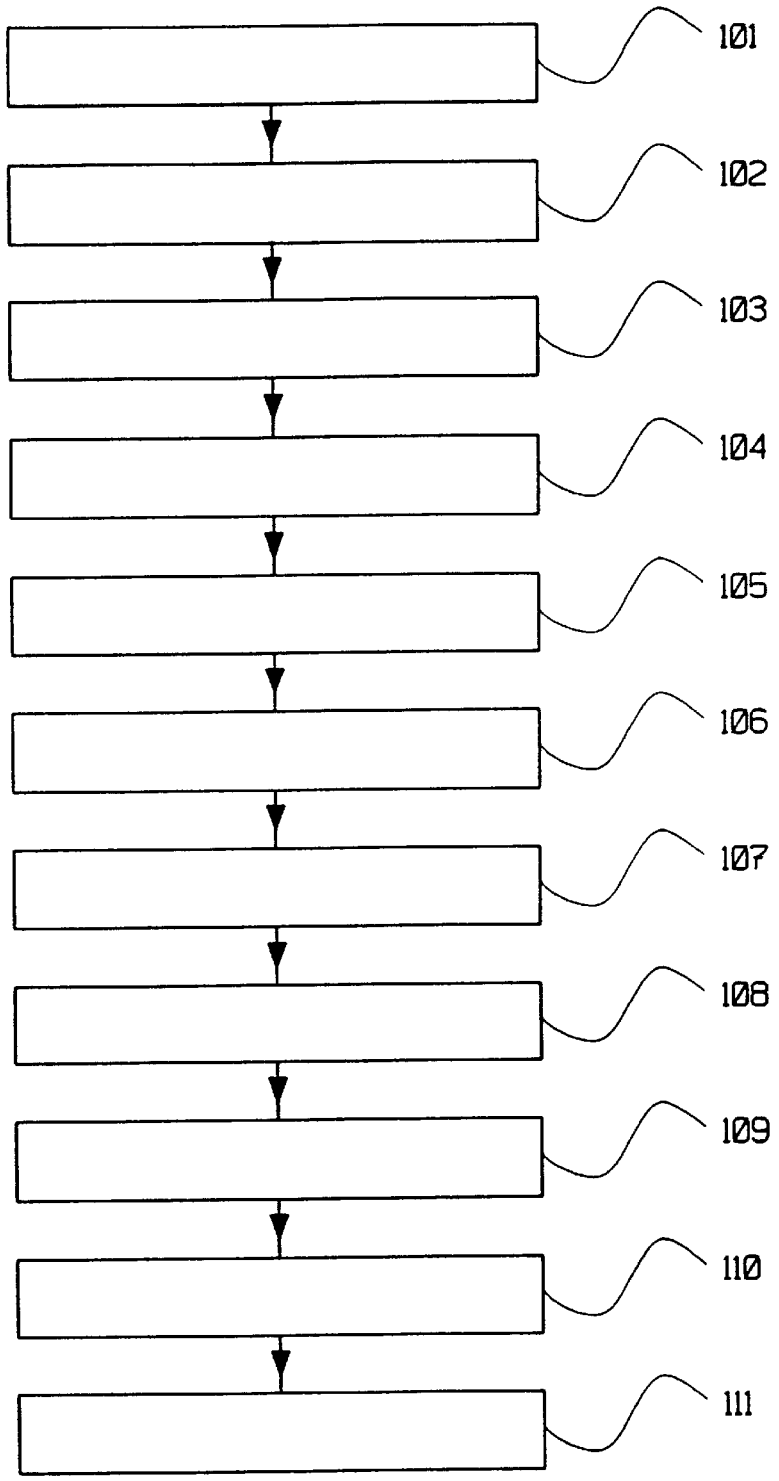
FIG. 5 is a flow sheet which illustrates the registration procedure shown in FIG. 4.

FIG. 5 is a flow sheet which illustrates the aforedescribed method. The flow sheet also shows the steps that are most essential to the inventive concept. The abbreviations used in the Figure text have been earlier explained with reference to FIG. 4. The procedure is carried out in accordance with FIG. 5 and comprises the following steps:

The SIM card is read in the GSM mobile MS2, in accordance with block 101.

An updating request 1 is sent to the GSM local switching centre MSC2, in accordance with block 102.

The GSM local switching centre MSC2 establishes that the subscriber is registered permanently in the roaming register ILR, in accordance with block 103.

Authorization information concerning the subscriber A is requested from the roaming register ILR through the authorization request 2, in accordance with block 104.

Authorization information is sent from the roaming register ILR to the GSM local switching centre MSC2 through the information response 3, in accordance with block 105.

The GSM local switching centre MSC2 checks the authorization of the subscriber A as a guest in the guest network, in accordance with block 106.

The roaming subscriber A is accepted, in accordance with block 107.

The GSM local switching centre MSC2 informs the roaming register ILR that the roaming subscriber A is located within a cell area handled by the GSM local switching centre MSC2 through the medium of the initiation message 4, in accordance with block 108.

The roaming register ILR registers the new position of the subscriber A, in accordance with block 109.

The address of the roaming register ILR is sent to the PDC home register HLR1 in the home network PDC through the medium of the registration message 5, in accordance with block 110.

The address of the roaming register ILR is inserted into the roaming subscriber data in the PDC home register HLR1, in accordance with block 111.

Figure 6:
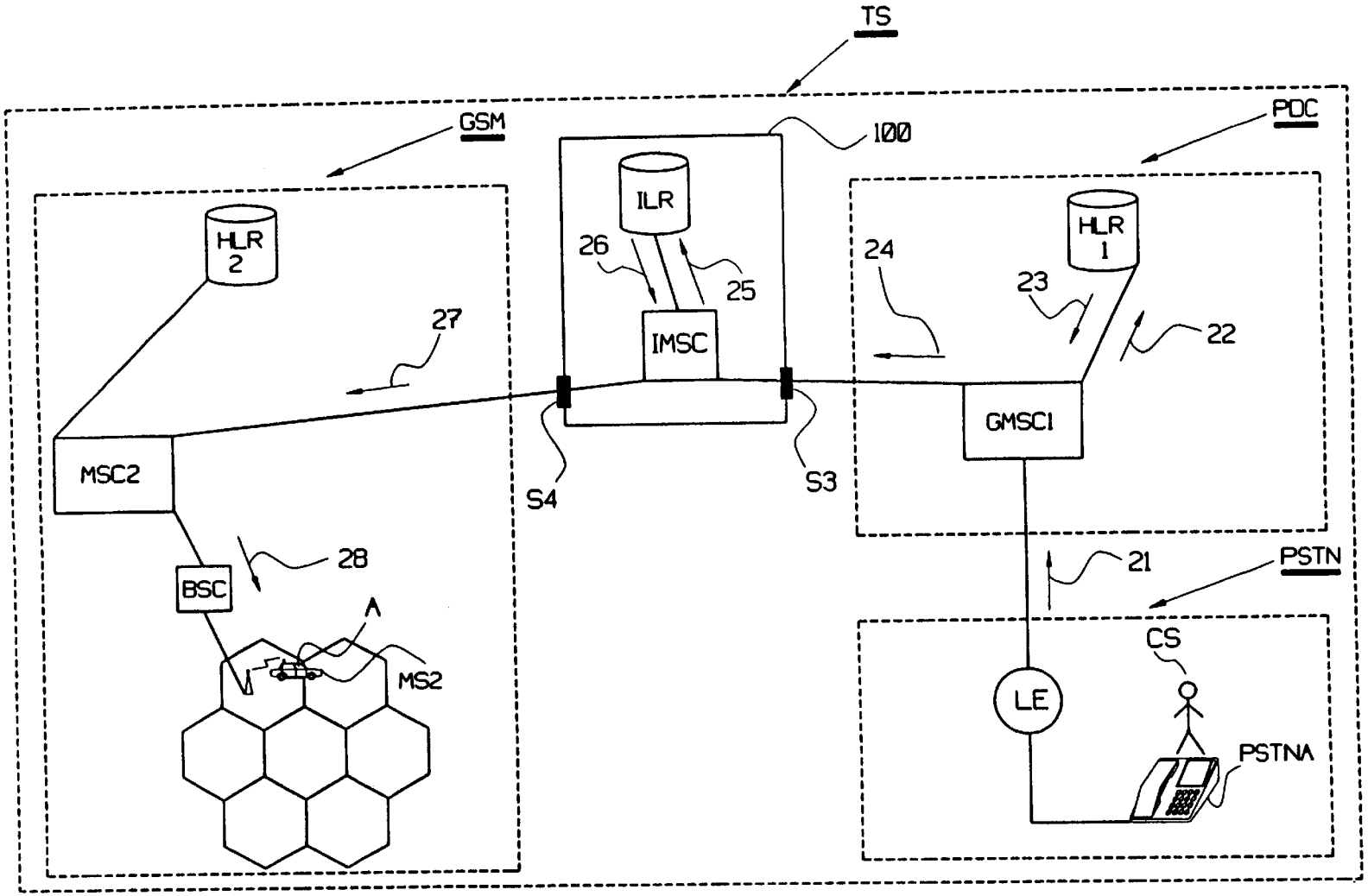
FIG. 6 illustrates schematically a telecommunications system which includes an inventive roaming arrangement, a first type of standardized network and a second type of standardized network. The Figure also shows the signalling procedure that is carried out when making a call.

Another method of procedure will now be described with reference to FIG. 6, in which a call is connected to the guest network GSM. FIG. 6 illustrates schematically some of the units earlier described with reference to FIG. 2 and having significance to the inventive method that will now be described in more detail. In the case of this embodiment, the telecommunications system TS includes a public switched telephone network which includes a public exchange LE which is connected to the PDC call switching centre GMSC1 in the home network PDC. The PDC call switching centre GMSC1 connected to the PDC home register has earlier been described with reference to FIG. 2 and is shown in said Figure. The calling subscriber CS uses a public switched telephone network unit PSTNA connected to the public exchange LE. The FIG. 6 illustration includes the roaming switching centre IMSC earlier described with reference to FIG. 2 and shown in said Figure. The roaming switching centre IMSC is connected to the roaming register ILR and also to both the PDC call switching centre GMSC1 and to the GSM local switching centre MSC2 in the guest network GSM. All fixed connections between the earlier enumerated signalling nodes, i.e. base stations, base control units, local switching centres, home register, roaming register, roaming switching centre, call switching centre, public exchange and calling subscriber have been shown in thick full lines in FIG. 6. The signalling is shown in FIG. 6 with the aid of thin full arrows which indicate signalling directions. The signalling illustrated in the Figure and necessary to the invention does not claim to be the full signalling procedure that is carried out when handling a subscriber who is registered in two different types of standard networks. The signalling that is considered to be well known is not described in the text nor shown in detail in the Figure. The method that will now be described is a so-called call procedure in which the calling subscriber in the public switched telephone network PSTN calls the roaming subscriber A, who is a guest in the guest network GSM and who uses the GSM mobile MS2. The method includes the following steps:

The calling subscriber CS calls the roaming subscriber A by keying-in the roaming subscriber call number with the and of the button pad on the public switched telephone network unit PSTNA.

A call signal 21 is sent from the public switched telephone unit PSTNA to the PDC call switching centre GMSC1, through the public exchange LE.

The PDC call switching centre GMSC1 sends to the PDC home register HLR1 a first query 22 concerning the location of the subscriber A.

The home register HLR1 sends to the PDC call switching centre GMSC1 a first reply 23 which includes an address to the roaming register ILR. The address of the roaming register ILR has already been mentioned in the description of the localizing procedure.

The PDC call switching centre GMSC1 analyzes the address of the roaming register ILR and extracts from this address an address to the roaming switching centre IMSC. This analysis of the address to the roaming register ILR is not important to an understanding of the invention and is considered well known to one skilled in this art and has not therefore been described in detail.

The call is forwarded from the PDC call switching centre GMSC1 to the roaming switching centre IMSC with the aid of a first routing message 24, which includes the address of the roaming switching centre IMSC.

The roaming switching centre IMSC sends to the roaming register ILR a second query 25 concerning the location of the roaming subscriber A.

The roaming register collects a so-called roaming number which is used temporarily in connecting the call. This collection is considered to be well known to a person skilled in this art and has not therefore been described in detail.

The roaming register ILR sends to the roaming switching centre IMSC a second response 26 which includes the roaming number and an address to the GSM local switching centre MSC2 in the guest network GSM.

The call is forwarded from the roaming switching centre IMSC to the GSM local switching centre MSC2 with the aid of a second routing message 27 which includes the address of the GSM local switching centre MSC2.

The call from the public switched telephone network unit PSTNA is connected to the roaming subscriber A by setting up a connection 28 between the GSM local switching centre MSC2 and the mobile MS2.

The aforedescribed signalling procedure does not claim to be the full signalling that is carried out when a call is made to the roaming subscriber A. Only signalling that is essential to the invention has been described above, while other signalling is considered to be well known to the person skilled in this art. It is again pointed out that the fact that the illustrated home network is a PDC-type network and that the illustrated guest network is a GSM-type network shall be seen only as an example of a conceivable configuration. The reversed may also be true, in which case the home network is a GSM-type network and the guest network is a PDC-type network. In this latter case in which the guest network is a PDC-type network, the collection of a roaming number is omitted. Similar minor differences in the signalling procedure carried out in different types of network are not significant to an understanding the invention. The person who is skilled in this art will be aware of such signalling differences.

Figure 7:
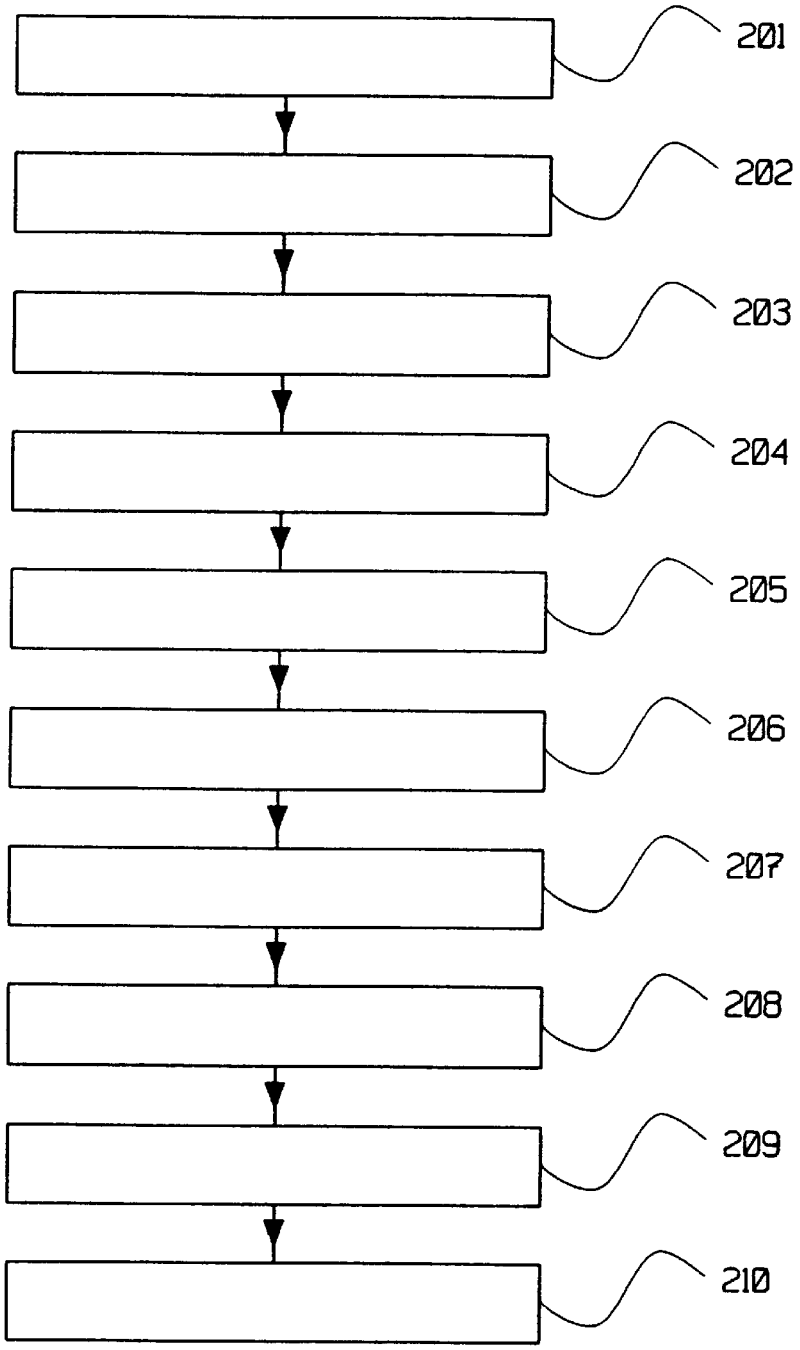
FIG. 7 is a flow sheet which illustrates the call procedure shown in FIG. 6.

FIG. 7 is a flow sheet describing the aforesaid method. The flow sheet illustrates the steps that are most essential to the inventive concept. Abbreviations used in the Figure text are considered to have been explained earlier with reference to FIG. 6. The method is carried out in accordance with FIG. 7 in the following manner:

The calling subscriber CS calls the roaming subscriber A, in accordance with block 201.

The called signal 21 is sent from the public switched telecommunications network unit PSTNA to the PDC call switching centre GMSC1, in accordance with block 202.

The first localizing query 22 is sent to the PDC home register HLR1 asking for the location of the subscriber A, in accordance with block 203.

The first localization response 23 containing the address of the roaming register ILR is sent to the PDC call switching centre GMSC1, in accordance with block 204.

The PDC call switching centre GMSC1 analyzes the address of the roaming register ILR and extracts from this address the address of the roaming switching centre IMSC, in accordance with block 205.

The call is forwarded to the roaming switching centre IMSC, in accordance with block 206.

The second localizing query 25 is sent to the roaming register ILR, asking for the location of the roaming subscriber A, in accordance with block 207.

The second localizing response 26 is sent to the roaming switching centre IMSC, in accordance with block 208.

The response is forwarded to the GSM local switching centre MSC2 with the aid of the response 26, in accordance with block 209.

The call set-up is finalized, in accordance with block 210.

Figure 8:
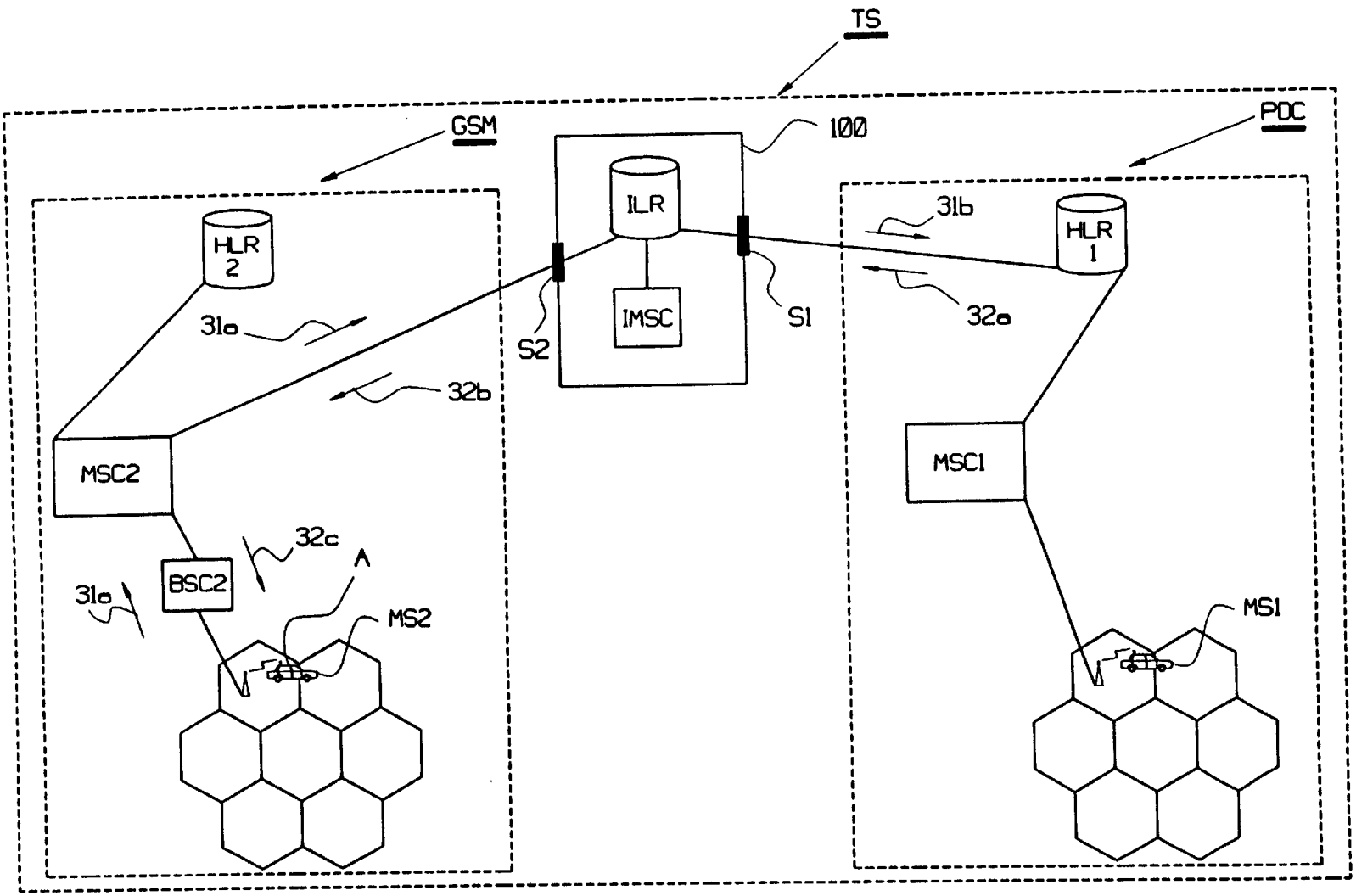
FIG. 8 illustrates schematically a telecommunications system which includes an inventive roaming arrangement, a first type of standardized network, and a second type of standardized network. The Figure also illustrates the signalling procedure that is carried out when handling a supplementary service.

FIG. 8 illustrates the same telecommunications system TS as that earlier described with reference to FIG. 4. The units included in the system TS, i.e. the mobile units MS1 and MS2, the base stations, the base control unit BSC2, the local switching centres MSC1 and MSC2, the home registers HLR1 and HLR2, and the roaming register ILR have earlier been described. The PDC home register HLR1 in the home network PDC contains information concerning supplementary services, other subscriber data, and other standard base services for those subscribers, for instance the roaming subscriber A, who are domicile in the network. A supplementary service may be a "call transfer" for instance There will now be described an inventive method of procedure for handling a supplementary service in the PDC home register HLR1 on the part of the roaming subscriber A, after this subscriber has moved from the home network PDC to the guest network GSM. The procedure includes the following steps:

A first handling request 31a is sent from the mobile unit MS2 to the roaming register ILR, via the GSM local switching centre MSC2. The request 31a includes information that the subscriber A wishes to handle the supplementary service "call transfer" and the type of handling that the subscriber wishes to perform.

The roaming register ILR receives the first handling request 31a and the request is transformed to a second handling request 31b which is sent from the roaming register ILR to the PDC home register HLR1 in the home network PDC.

The specified supplementary service is handled in the PDC home register HLR1 in accordance with the wishes of subscriber A.

A first handling acknowledgement 32a is sent from the PDC home register HLR1 to the roaming register (ILR), this message confirming that the specified service has been handled in the PDC home register HLR1 in accordance with the wishes of subscriber (A).

The first handling acknowledgement 32a is received in the roaming register ILR and the message is transformed to a second handling acknowledgement 32b, which is sent from the roaming register ILR to the mobile unit MSC2, via the local switching centre MS2.

Figure 9:
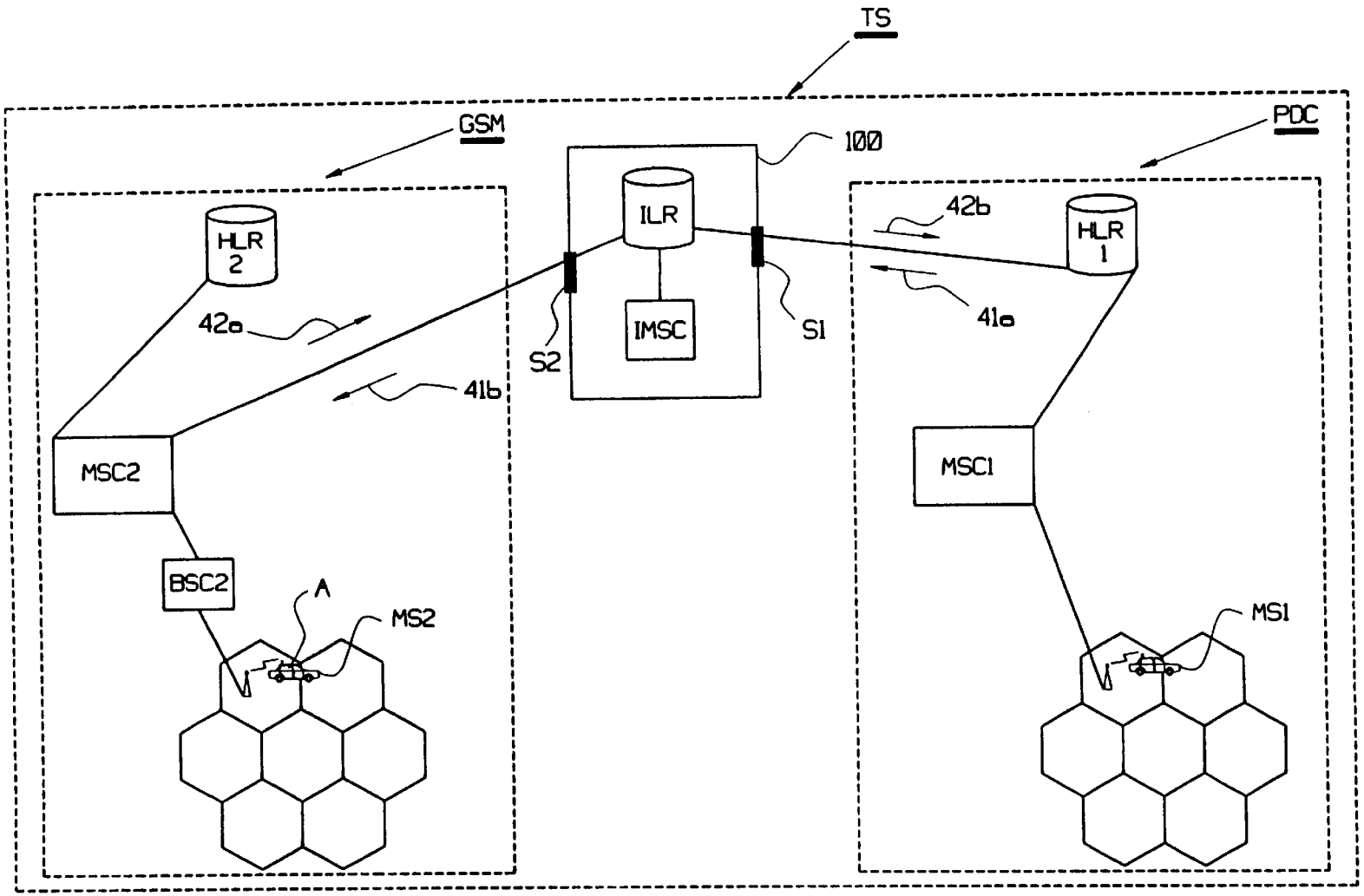
FIG. 9 illustrates schematically a telecommunications system which includes an inventive roaming arrangement, a first type of standardized network and a second type of standardized network. The Figure also illustrates the signalling procedure that is carried out when informing the system of supplementary service changes.

FIG. 9 illustrates the same telecommunications system TS as that described in the aforegoing with reference to FIG. 4. The units included in the system TS, i.e. the mobile units MS1 and MS2, the base stations, the base control unit BSC2, the local switching centres MSC1 and MSC2, the home registers HLR1 and HLR2, and the roaming register ILR have been well described in the aforegoing. The PDC home register HLR1 in the home network PDC contains information concerning supplementary services for those subscribers that are domicile in the network, for instance the roaming subscriber A. In conjunction with the localizing procedure earlier described, the GSM local switching centre MSC2 in whose cell area the roaming subscriber A is located obtains information concerning those services that are available to the roaming subscriber A. An inventive method of procedure, which will now be described, informs the local switching centre, in this case the GSM local switching centre, that a supplementary service has been changed, for instance to the service "block on outgoing calls". The change in service may have been ordered, for instance, by the networkoperator who handles the supplementary services available to the roaming subscriber A. The method includes the following steps:

Sending a first change message 41a from the PDC home register HLR1 in the home network PDC to the roaming register ILR, this message 41a informing that a change of supplementary service has taken place. The first change message 41a is received in the roaming register ILR and is transformed to a second change message 41b, which is sent from the roaming register ILR to the GSM local switching centre MSC2 in the guest network GSM.

The change of supplementary service is noted in the local switching centre MSC2 in the guest network GSM.

A first change acknowledgement 42a is sent from the local switching centre MSC2 in the guest network GSM to the roaming register ILR, this message 42a confirming that the change has been implemented.

The first change confirmation 42a is received in the roaming register ILR and is transformed to a second change acknowledgement 42b which is sent from the roaming register ILR to the home register HLR1 in the home network PDC.

Figure 10:
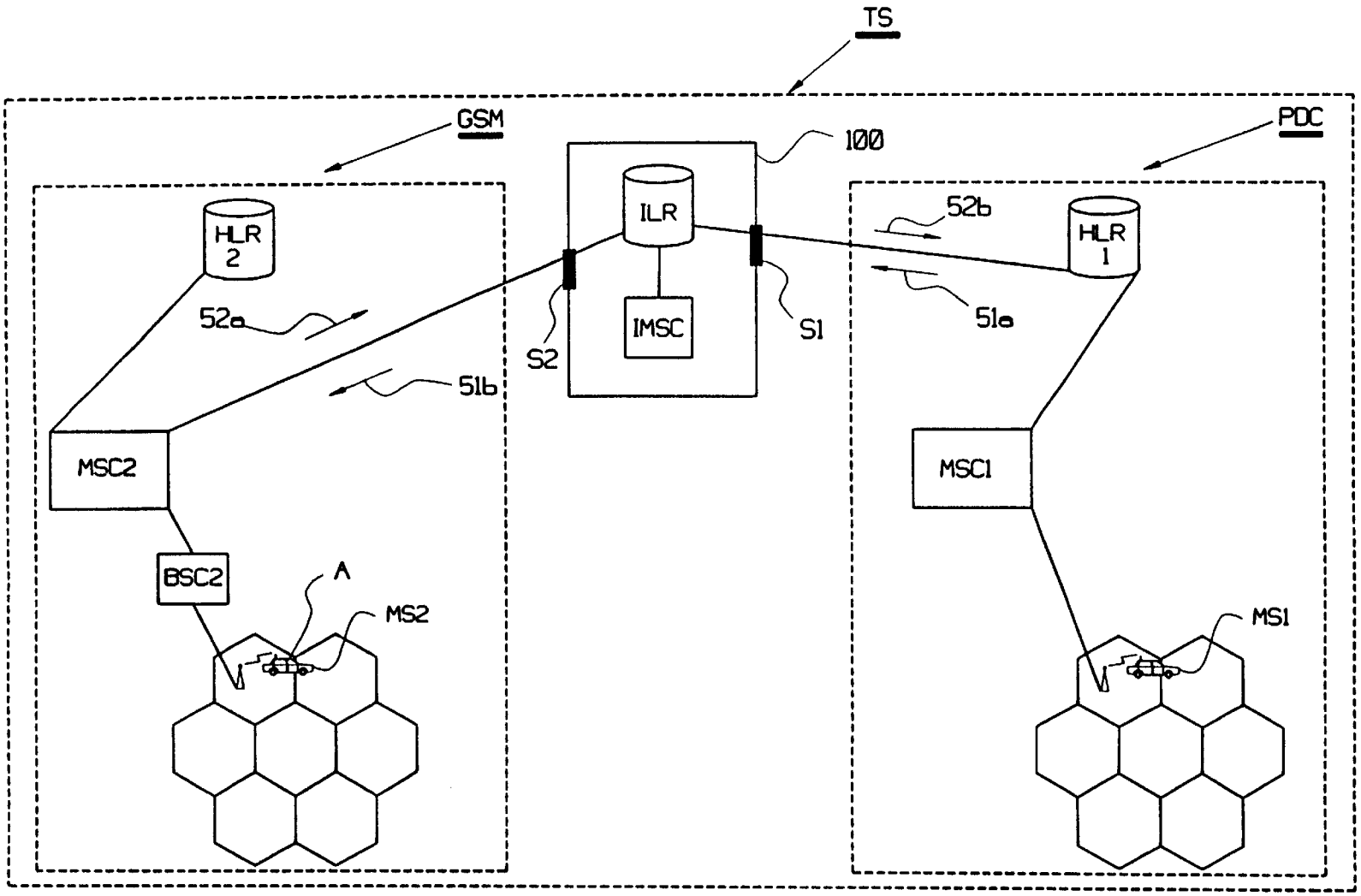
FIG. 10 illustrates schematically a telecommunications system which includes an inventive roaming arrangement, a first type of standardized network and a second type of standardized network. The Figure also illustrates the signalling procedure that is carried out when handling errors.

FIG. 10 illustrates the same telecommunications system TS as that described with reference to FIG. 4. The units included in the system TS, i.e. the mobile units MS1 and MS2, the base stations, the base control unit BSC2, the local switching centres MSC1 and MSC2, the home registers HLR1 and HLR2, and the roaming register ILR have been well described in the aforegoing. The aforementioned roaming subscriber A is found in the GSM local switching centre MSC2. The PDC home register HLR1 in the home network PDC contains information relating to the position of the roaming subscriber A in the GSM local switching centre MSC2. The method now described illustrates the signalling procedure that is followed when an error has occurred in the home register HLR1. The method includes the following steps:

An error occurs in the PDC home register HLR1 and information contained in the register HLR1 concerning the position of subscribers, for instance the roaming subscriber A, has been erased.

A first error message 51a is sent to the roaming register ILR from the PDC home register HLR1 in the home network PDC, this message 51l informing that an error has occurred in the PDC home register HLR1. The error message is also sent to other units to which the PDC home register is connected, for instance to the PDC local switching centre MSC1, and which may have provided the PDC home register with information concerning subscriber positions.

The first error message 51a is received in the roaming register ILR and is transformed to a second error message 51b which is sent from the roaming register ILR to the GSM local switching centre MSC2 in the guest network GSM.

A notation is made in the local switching centre MSC2, wherein this notation can be used later to initiate a new updating of the position of the roaming subscriber when the subscriber next signals to the local switching centre MSC2.

The following two steps can be omitted in certain cases, depending on the configuration of the guest network.

A first error acknowledgement 52a is sent to the roaming register ILR from the GSM local switching centre MSC2 in the guest network GSM, this message 52a acknowledging the receipt of the error message.

The first error acknowledgement 52a is received in the roaming register ILR and is transformed to a second error acknowledgement 52b, which is sent from the roaming register ILR to the home register HLR1 in the home network PDC.

Figure 11:
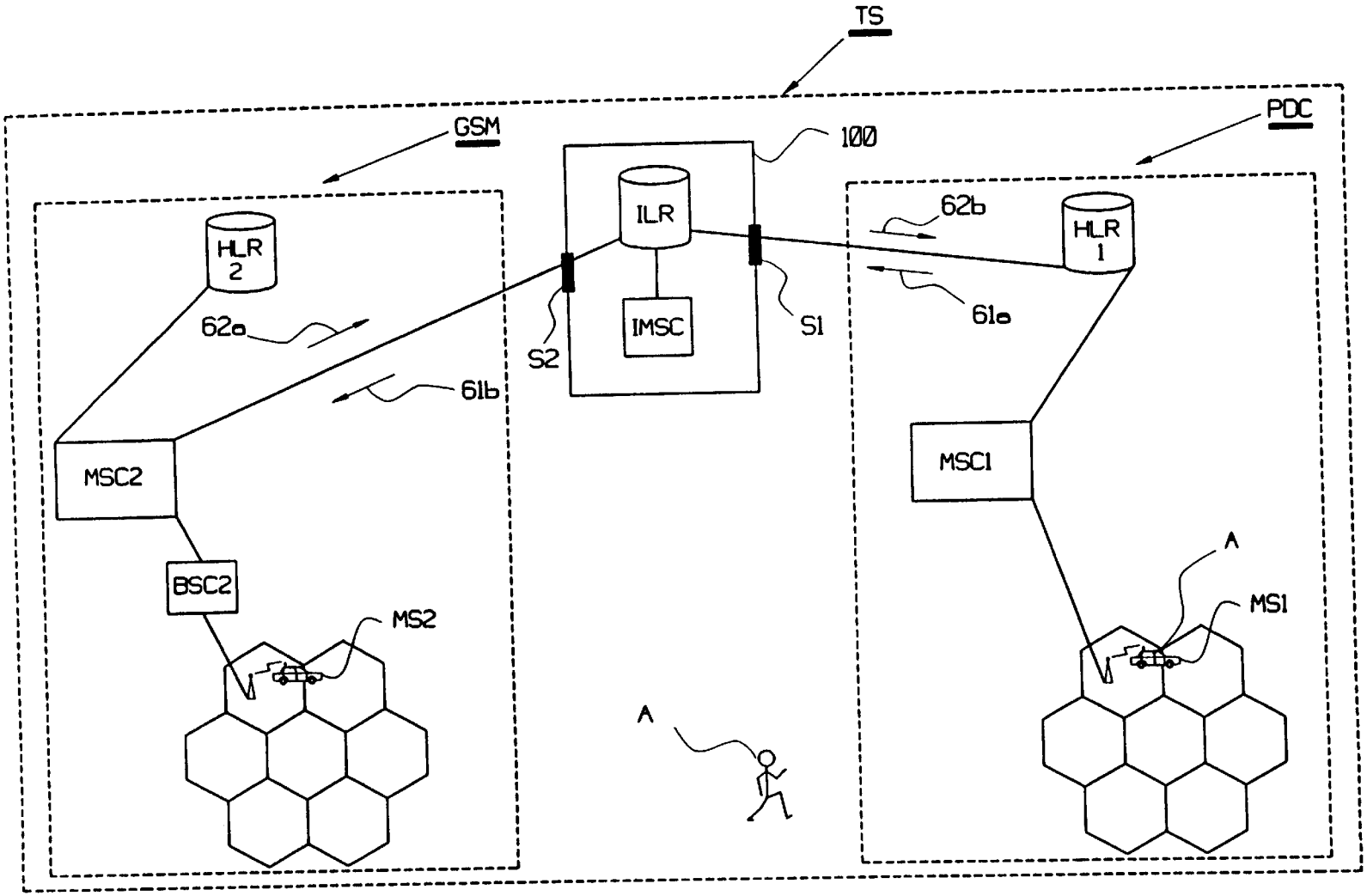
FIG. 11 illustrates schematically a telecommunications system which includes an inventive roaming arrangement, a first type of standardized network and a second type of standardized network. The Figure also illustrates the signalling procedure that is carried out in a de-registration operation.

FIG. 11 illustrates the same telecommunications system TS as that described in the aforegoing with reference to FIG. 4. The units included in the system TS, i.e. the mobile units MS1 and MS2, the base stations, the base control unit BSC2, the local switching centres MSC1 and MSC2, the home registers HLR1 and HLR2, and the roaming register ILR, have been well described in the aforegoing with reference to FIG. 4. The roaming subscriber A has been registered in the PDC home register HLR1 as a guest in the guest network GSM, with the aid of the earlier described localizing method. The PDC home register therewith contains information to the effect that the roaming subscriber A is found in the GSM local switching centre MSC2. There will now be described a dc-registering procedure which is carried out after the subscriber A has moved from the GSM mobile in the guest network GSM to the home network PDC. The method includes the following steps, of which the first five are considered to be well known to the skilled person and have not therefore been shown in FIG. 11:

The roaming subscriber A moves to the PDC mobile MS1 in the home network PDC.

The reader in the PDC mobile MS1 reads the SIM card.

An updating request is sent from the PDC mobile MS1 to the PDC local switching centre MSC1. This updating request includes the identity of the subscriber A.

The authorization of subscriber A in the home network is checked and accepted in the PDC local switching centre MSC1.

The PDC local switching centre MSC1 sends to the PDC home register HLR1 an initiation message which includes information to the effect that the roaming subscriber A is located within a cell area that is handled by the PDC local switching centre MSC1.

The above method steps are considered to be well known to the skilled person and have not therefore been shown in FIG. 9. The following steps are relevant to the inventive method:

A first deactivating message 61 is sent to the roaming register ILR from the PDC home register HLR1 in the home network PDC, this message 61a informing that the subscriber A is no longer found in the guest network GSM.

The roaming register ILR is updated with respect to the fact that the subscriber is no longer located in the guest network GSM.

The first deactivating message 61a is transformed to a second deactivating message 61b which is sent from the roaming register ILR to the PDC local switching centre MSC2 in the guest network GSM.

Subscriber data relating to the subscriber A is deactivated in the local switching centre MSC2.

A first deactivating acknowledgement 62a is sent from the GSM local switching centre MSC2 to the roaming register ILR.

The first deactivating acknowledgement 62a is transformed to a second deactivating acknowledgement 62b which is sent from the roaming register ILR to the PDC home register HLR1.

It will be understood that the aforedescribed exemplifying embodiments may be modified in several ways within the scope of the present invention. For instance, the telecommunications system may conceivably have a different structure to that described. An example of such a telecommunications system is a GSM network which includes satellite-based air interfaces which are connected to a PDC network of the type earlier described, through the medium of ground-based GSM equipment and through the medium of the roaming arrangement. Since the satellite-based GSM system handles signalling in the same way as the totally ground-based GSM system described in the previous embodiments, there will be no difficulty in using the roaming arrangement in a satellite-based system. An exercise of this nature may find application in future telecommunications systems in which a PDC subscriber moves outside the area covered by the subscriber's network, for instance leaves Japan, to a geographic area which is not covered by the PDC system but which is covered by the second telecommunications system which has a different net signalling standard, for instance a GSM-type signalling standard, through the medium of the satellite-based air interface.

Figure 12:
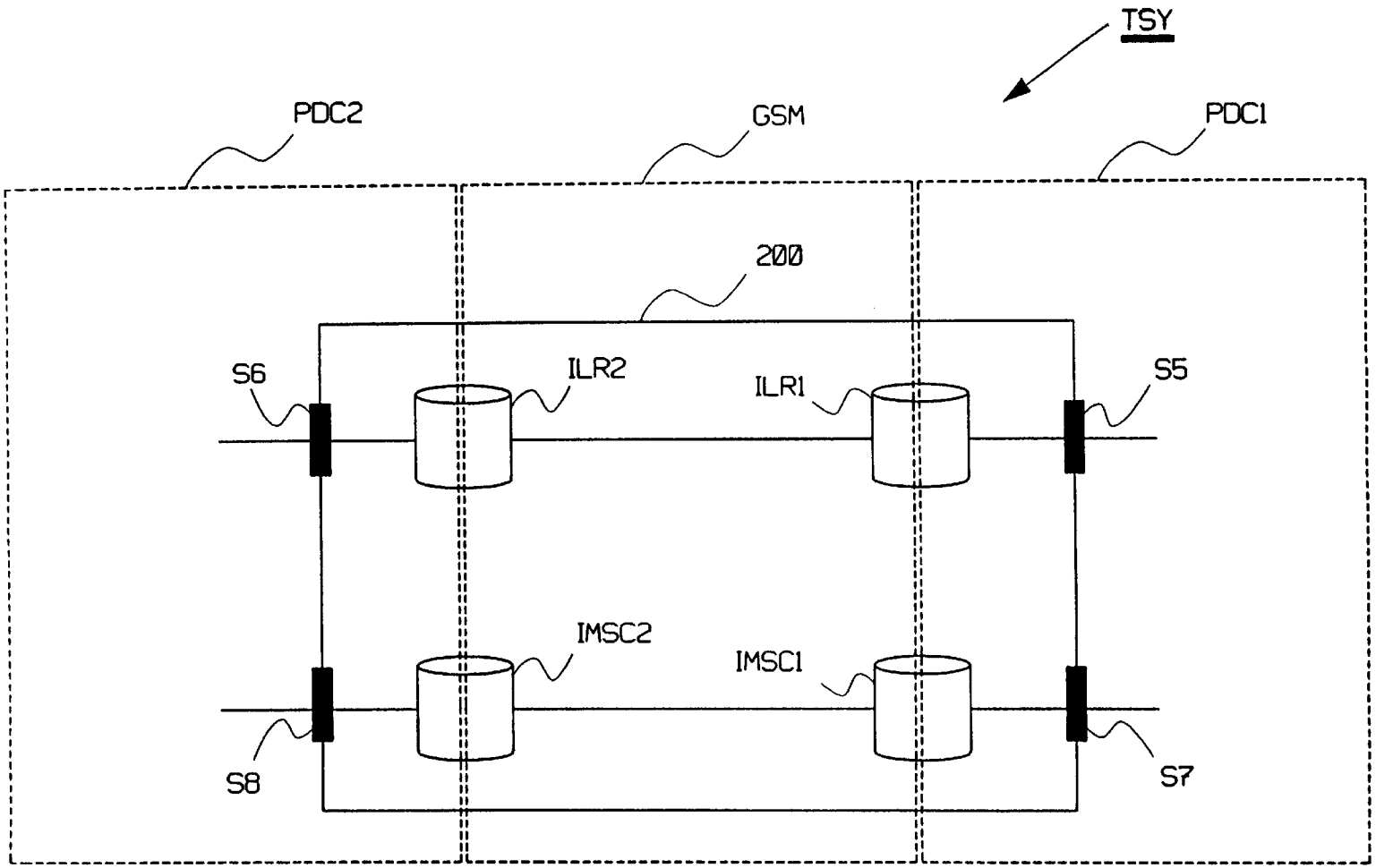
FIG. 12 illustrates a telecommunications system which includes another inventive roaming arrangement, a first type of standardized network and a second type of standard network.

There will now be briefly described a further exemplifying embodiment of the inventive concept with reference to FIG. 12. FIG. 12 illustrates a telecommunications system TSY which includes a PDC-type home network PDC1 and a PDC-type guest network PDC2. The PDC networks, PDC1 and PDC2, of the illustrated embodiment do not enable international roaming. The telecommunications system TSY includes an intermediate telecommunications network which, in the illustrated case, is a GSM-type network. FIG. 12 illustrates an inventive roaming arrangement 200 which is slightly different to the roaming arrangements illustrated and described above. The roaming arrangement 200 of this embodiment includes a first signal-handling means ILR1 and IMSC1 between the home network PDC1 and GSM network. The roaming arrangement 200 also includes a second signal-handling means ILR2, IMSC2 between the GSM network and the guest network PDC2. The home network PDC1 recognizes the first signal-handling means ILR1, IMSC1 as a signalling node in the home network, i.e. in the same manner as in the earlier described embodiments. The guest network PDC2 recognizes the second signal-handling means ILR2, IMSC2 as a signalling node in the guest network, i.e. in the same way as that earlier described. Similar to the earlier described roaming arrangement 100, the roaming arrangement 200 of this embodiment also includes a home interface S5, S7 towards the home network PDC1, and a guest interface S6, S8 towards the guest network PDC2. Signals are moved through the GSM network within the roaming arrangement 200, between the first signal-handling arrangement ILR1, IMSC1 and the second signal-handling arrangement ILR2. IMSC2, with the aid of a signal transport mechanism which, in the case of the illustrated embodiment, is of the well-known type CCITT No. 7. The home network PDC1 and the guest network PDC2 will be seen only as examples of such networks. Naturally, other types of networks are conceivable instead of the two PDC-type networks.

It will be understood that the aforedescribed and illustrated exemplifying embodiments may include a number of variations without deviating from the scope of the invention. For instance, the roaming register ILR may include more than one guest interface. It is conceivable to use an ADC-type home network and two different guest networks, of which one is a PDC-type network and the other is an analog NMT-type network, for instance. It is also conceivable for the subscriber A to use one mobile telephone in one type of network and then use a mobile computer unit in another type of network, for instance a MOBITEX-type network. There are, of course, many types of different traffic cases in which the invention can be used. For instance, the calling subscriber CS may use a mobile unit instead of the public switched telephone network unit PSTNA shown in the exemplifying embodiments. The SIM card described in embodiments above is not necessary when carrying out the invention. It is also conceivable that the subscriber A will indicate his absence or presence by switching on or off those mobile units which he has at his disposal. The design of the mobile telephone unit is not significant to the concept on which the invention is based. For instance, a mobile telephone unit having a double radio interface, one for the home network and one for the guest network, is also conceivable. It has already been shown that the signalling procedure can be varied in certain ways. For instance, the procedure followed to check whether or not the subscriber is authorized can be carried out in a telephone network unit other than the local switching centre. Neither need the structure of the telecommunications system be the aforedescribed and illustrated structure. For instance, it is also conceivable to use satellite based base stations. It is also conceivable to use base stations that are wireless-connected or cordless-connected to local switching centres or base control units.

It will be understood that the invention is not limited to the aforedescribed and illustrated exemplifying embodiments thereof and that modifications can be made within the scope of the following Claims.

What is claimed is:

1. A roaming arrangement in a telecommunications system for handling a mobile telephone subscriber, wherein the system includes a home network that is a first standardized type of mobile telephone network and at least one guest network that is a second standardized type of mobile telephone network, and the mobile telephone subscriber has a call number which is common to both the home network and the guest network, the roaming arrangement comprising:

means for handling signals;

at least one home interface towards the home network, wherein the home interface is arranged to receive signals from the home network and to transmit signals to the home network, the signals having a format that is the same as a signal format that occurs in the home network;

at least one guest interface towards the guest network, wherein the guest interface is arranged to receive signals from the guest network and to transmit signals to the guest network, the signals having a format that is the same as a signal format that occurs in the guest network;

wherein the home network and the guest network each include a home register and a local switching center;

the signal handling means includes a roaming register which is connected to the home network via a first signalling interface in the home interface;

the first signalling interface is located between the home register in the home network and the roaming register, *which* is [also] connected to the guest network via a second signalling interface in the guest interface, and is of a same type as a standardized interface between the home register and the local switching center in the home network; and the second signalling interface is located between the local switching center in the guest network and the roaming register and is of a same type as a standardized interface between the local switching center and the home register in the guest network.

2. The roaming arrangement of claim 1, wherein the home network includes at least one first call switching center for receiving a call from a calling subscriber to the mobile telephone subscriber;

the signal handling means includes a roaming switching center which is connected to the home network via a third signalling interface in the home interface between the roaming switching center and the call switching center in the home network;

the roaming switching center is also connected to the guest network via a fourth signalling interface in the guest interface between the roaming switching center and the local switching center in the guest network;

the third signalling interface is of the same type as a standardized interface between a first call switching center and the local switching center in the home network; and the fourth signalling interface is of the same type as a standardized interface between the local switching center and a second call switching center in the guest network.

3. A roaming arrangement in a telecommunications system for handling a mobile telephone subscriber, wherein the system includes a home network that is a first standardized type of mobile telephone network and at least one guest network that is a second standardized type of mobile telephone network, and the mobile telephone subscriber has a call number which is common to both the home network and the guest network, the roaming arrangement comprising:

means for handling signals;

at least one home interface towards the home network, wherein the home interface is arranged to receive signals from the home network and to transmit signals to the home network, the signals having a format that is the same as a signal format that occurs in the home network;

at least one guest interface towards the guest network, wherein the guest interface is arranged to receive signals from the guest network and to transmit signals to the guest network, the signals having a format that is the same as a signal format that occurs in the guest network, wherein the home network and the guest network each include a home register and a local switching center;

the home network also includes a guest register in which subscribers visiting the local switching center are registered;

the signal handling means includes a roaming register which is connected to the home network via a first signalling interface in the home interface and which is connected to the guest network via a second signalling interface in the guest interface;

the first signalling interface is located between the home register in the home network and the roaming register and is of a same type as a standardized interface between the home register and the guest register; and the second signalling interface is located between the local switching center in the guest network and the roaming register and is of a same type as a standardized interface between the local switching center and the home register in the guest network.

4. The roaming arrangement of claim 3, wherein the home network includes at least one first call switching center for receiving a call from a calling subscriber to the mobile telephone subscriber;

the signal handling means includes a roaming switching center which is connected to the home network via a third signalling interface in the home interface between the roaming switching center and the call switching center in the home network;

the roaming switching center is also connected to the guest network via a fourth signalling interface in the guest interface between the roaming switching center and the local switching center in the guest network;

the third signalling interface is of a same type as a standardized interface between a first call switching center and the local switching center in the home network; and the fourth signalling interface is of the same type as a standardized interface between the local switching center and a second call switching center in the guest network.

5. A roaming arrangement in a telecommunication system for handling a mobile telephone subscriber, wherein the system includes a home network that is a first standardized type of mobile telephone network and at least one guest network that is a second standardized type of mobile telephone network, and the mobile telephone subscriber has a call number which is common to both the home network and the guest network, the roaming arrangement comprising:

means for handling signals;

at least one home interface towards the home network, wherein the home interface is arranged to receive signals from the home network and to transmit signals to the home network, the signals having a format that is the same as a signal format that occurs in the home network;

at least one guest interface towards the guest network, wherein the guest interface is arranged to receive signals from the guest network and to transmit signals to the guest network, the signals having a format that is the same as a signal format that occurs in the guest network, wherein the home network and the guest network each include a home register and a local switching center;

the guest network also includes a guest register in which subscribers visiting the local switching center are registered;

the signal handling means includes a roaming register which is connected to the home network via a first signalling interface in the home interface and which is connected to the guest network via a second signalling interface in the guest interface;

the first signalling interface is located between the home register in the home network and the roaming register and is of a same type as a standardized interface between the home register and the local switching center in the home network; and the second signalling interface is located between the guest register in the guest network and the roaming register and is of a same type as a standardized interface between the guest register and the home register in the guest network.

6. The roaming arrangement of claim 5, wherein the home network includes at least one first call switching center for receiving a call from a calling subscriber to the mobile telephone subscriber;

the signal handling means includes a roaming switching center which is connected to the home network via a third signalling interface in the home interface between the roaming switching center and the call switching center in the home network;

the roaming switching center is also connected to the guest network via a fourth signalling interface in the guest interface between the roaming switching center and the local switching center in the guest network;

the third signalling interface is of a same type as a standardized interface between a first call switching center and the local switching center in the home network; and the fourth signalling interface is of a same type as a standardized interface between the local switching center and a second call switching center in the guest network.

7. A roaming arrangement in a telecommunications system for handling a mobile telephone subscriber, wherein the system includes a home network that is a first standardized type of mobile telephone network and at least one guest network that is a second standardized type of mobile telephone network, and the mobile telephone subscriber has a call number which is common to both the home network and the guest network, the roaming arrangement comprising:

means for handling signals;

at least one home interface towards the home network, wherein the home interface is arranged to receive signals from the home network and to transmit signals to the home network, the signals having a format that is the same as a signal format that occurs in the home network;

at least one guest interface towards the guest network, wherein the guest interface is arranged to receive signals from the guest network and to transmit signals to the guest network, the signals having a format that is the same as a signal format that occurs in the guest network, wherein the home network and the guest network each include a home register, a local switching center, and a guest register in which subscribers visiting the local switching center are registered;

the signal handling means includes a roaming register which is connected to the home network via a first signalling interface in the home interface and which is connected to the guest network via a second signalling interface in the guest interface;

the first signalling interface is located between the home register in the home network and the roaming register and is of a same type as a standardized interface between the home register and the guest register; and the second signalling interface is located between the local switching center in the guest network and the roaming register and is of a same type as a standardized interface between the guest register and the home register in the guest network.

8. The roaming arrangement of claim 7, wherein the home network includes at least one first call switching center for receiving a call from a calling subscriber to the mobile telephone subscriber;

the signal handling means includes a roaming switching center which is connected to the home network via a third signalling interface in the home interface between the roaming switching center and the call switching center in the home network;

the roaming switching center is also connected to the guest network via a fourth signalling interface in the guest interface between the roaming switching center and the local switching center in the guest network;

the third signalling interface is of a same type as a standardized interface between a first call switching center and the local switching center in the home network; and the fourth signalling interface is of a same type as a standardized interface between the local switching center and a second call switching center in the guest network.

9. A roaming arrangement relating to a telecommunications system for handling a mobile telephone subscriber, wherein the telecommunications system includes a home network that is a first standardized type of mobile telephone network and at least one guest network that is a second standardized type of mobile telephone network, and the mobile telephone subscriber has a call number which is common to both the home network and the guest network, the roaming arrangement comprising:

a first means for handling signals;

a second means for handling signals;

at least one home interface towards the home network, wherein the home interface is adapted to receive signals from the home network and to transmit signals to the home network, the signals having a format that is the same as a signal format that occurs in the home network; and at least one guest interface towards the guest network, wherein the guest interface is adapted to receive signals from the guest network and to transmit signals to the guest network, the signals having a format that is the same as a signal format that occurs in the guest network, wherein the home network and the guest network each include a home register and a local switching center;

the first signal handing means includes a first roaming register which is connected to the home network via a first signalling interface in the home interface;

the first signalling interface is located between the home register in the home network and the first roaming register, *which* is [also] connected to the guest network via a second roaming register included in the second signal handling means and via a second signalling interface in the guest interface, and is of a same type as a standardized interface between the home register and the local switching center in the home network; and the second signalling interface is located between the local switching center in the guest network and the second roaming register and is of a same type as a standardized interface between the local switching center and the home register in the guest network.

10. The roaming arrangement of claims 9, wherein at least one of the home network and the guest network includes at least one satellite-based air interface.

11. A method, relating to a telecommunications system, of handling a mobile telephone subscriber having a call number which is common to both a home network that is a first standardized type of mobile telephone network and a guest network that is a second standardized type of mobile telephone network; wherein the home network includes a home register in which the mobile telephone subscriber is registered permanently as being domestic in the home network, the guest network includes a local switching center for handling signalling to and from mobile units that are located in a cell area handled by the local switching center, the telecommunications system includes a roaming arrangement which includes a roaming register in which the mobile telephone subscriber is permanently registered as a conceivable guest in the guest network, and the roaming register is connected to the local switching center in the guest network and also to the home register in the home network; the method comprising the steps of:

activating, by the mobile telephone subscriber, a mobile unit located in the guest network in the cell area of the local switching center;

sending, from the mobile unit to the local switching center, an updating request which includes an identity of the mobile telephone subscriber;

establishing, in the local switching center in the guest network, that the mobile telephone subscriber is permanently registered in the roaming register based on the identity of the mobile telephone subscriber;

checking an authorization of the mobile telephone subscriber as a guest in the guest network;

accepting the authorization of the mobile telephone subscriber as a guest in the guest network;

sending, from the local switching center to the roaming register, an initiation message which includes information indicating that the mobile telephone subscriber is found in the local switching center;

updating the roaming register with a new position of the mobile telephone subscriber, the new position being the local switching center in the guest network;

sending, from the roaming register to the home register in the home network, an updating message which includes information indicating that the mobile telephone subscriber is found in the roaming register; and updating the home register in the home network with subscriber-relevant information.

12. The method of claim 11, the method further comprising the steps of:

sending, from the local switching center to the roaming register, a request for information that is required to check subscriber authorization; and sending, from the roaming register to the local switching center, an information response which contains the information that is required to check subscriber authorization.

13. The method of claim 11, further comprising the step of collecting, from the roaming arrangement, a roaming number to the home register in the home network.

14. The method of claim 11, further comprising the step of collecting, from the local switching center in the guest network, a roaming number to the roaming arrangement.

15. A method relating to a roaming arrangement in a telecommunications system for handling a mobile telephone subscriber, wherein the telecommunications system includes a home network that is a first standardized type of mobile telephone network and that includes a call switching center which is connected to a home register and to the roaming arrangement, and at least one guest network that is a second standardized type of mobile telephone network, wherein the mobile telephone subscriber has a call number which is common to both the home network and the guest network, and wherein the roaming arrangement includes a roaming switching center which is connected to a roaming register, a first means for handling signals, a second means for handling signals, at least one home interface that is arranged to receive and transmit signals having a format that is the same as a signal format that occurs in the home network from and to the home network, and at least one guest interface that is arranged to receive and transmit signals having a format that is the same as a signal format that occurs in the guest network from and to the guest network, the method comprising the steps of:

calling, by a calling subscriber from a public switched telephone network unit in the telecommunications system, the mobile telephone subscriber, wherein the calling step includes the step of sending a call signal from the public switched telephone network unit to the call switching center in the home network;

sending, from the call switching center to the home register, a first query seeking a location of the mobile telephone subscriber;

sending, from the home register to the call switching center, a first response which includes a first address to the roaming switching center;

forwarding the call from the call switching center to the roaming switching center based on a first routing message which includes the first address;

sending, from the roaming switching center to the roaming register, a second query seeking the location of the mobile telephone subscriber;

sending, from the roaming register to the roaming switching center, a second response which includes a second address to a local switching center in the guest network;

forwarding the call from the roaming switching center to the local switching center based on a second routing message which includes the second address; and finalizing the call from the public switched telephone network unit to the mobile telephone subscriber by establishing a connection between the local switching center and the mobile unit.

16. A method relating to a roaming arrangement in a telecommunications system for handling a mobile telephone subscriber, wherein the telecommunications system includes a home network that is a first standardized type of mobile telephone network, wherein a home register in the home network includes information relating to supplementary services that are available to the mobile telephone subscriber, at least one guest network that is a second standardized type of mobile telephone network, and the mobile telephone subscriber has a call number which is common to both the home network and the guest network, and wherein the roaming arrangement includes *a* roaming register, a first means for handling signals, a second means for handling signals, at least one home interface that is arranged to receive signals from and transmit signals to the home network, the signals having a format that is the same as a signal format that occurs in the home network, and at least one guest interface that is arranged to [receives signal] *receive signals* from and transmit signals to the guest network, the signals having a format that is the same as a signal format that occurs in the guest network, the method comprising the steps of:

sending, from the mobile unit to the roaming register via a local switching center in the guest network, a first handling request which includes information indicating how the mobile telephone subscriber wishes to handle a supplementary service;

transforming the first handling request to a second handling request and sending the second handling request from the roaming register to the home register in the home network; and handling the supplementary service in the home register in the home network in accordance with the information.

17. The method of claim 16, further comprising the steps of:

sending, from the home register in the home network to the roaming register, a first handling acknowledgement which acknowledges handling of the supplementary service in accordance with the information; and transforming the first handling acknowledgement to a second handling acknowledgement and sending the second acknowledgement from the roaming register to the mobile unit via the local switching center.

18. A method relating to a roaming arrangement in a telecommunications system for handling a mobile telephone subscriber, wherein the telecommunications system includes a home network that is a first standardized type of mobile telephone network, wherein a home register in the home network and a local switching center include information relating to supplementary services that are available to the mobile telephone subscriber, and at least one guest network that is a second standardized type of mobile telephone network, and the mobile telephone subscriber has a call number which is common to both the home network and the guest network, and wherein the roaming arrangement includes *a* roaming register, a first means for handling signals, a second means for handling signals, at least one home interface that is arranged to receive signals from and transmit signals to the home network, the signals having a format that is the same as a signal format that occurs in the home network, and at least one guest interface that is arranged to receive signals from and transmit signals to the guest network, the signals having a format that is the same as a signal format that occurs in the guest network, the method comprising the steps of:

sending, from the home register in the home network to the roaming register, a first change message indicating that a change of supplementary service has taken place;

transforming the first change message to a second change message and sending the second change message from the roaming register to the local switching center in the guest network;

noting the supplementary service change in the local switching center in the guest network;

sending, to the roaming register from the local switching center in the guest network, a first change acknowledgment *message* which acknowledges that the change has been implemented; and transforming the first change acknowledgment message to a second change acknowledgement message and sending the second change acknowledgement message from the roaming register to the home register in the home network.

19. A method relating to a roaming arrangement in a telecommunications system for handling a mobile telephone subscriber, wherein the telecommunications system includes a home network that is a first standardized type of mobile telephone network, wherein a home register in the home network and a local switching center include information concerning supplementary services that are available to the mobile telephone subscriber, and at least one guest network that is a second standardized type of mobile telephone network, and the mobile telephone subscriber has a call number which is common to both the home network and the guest network, and wherein the roaming arrangement includes *a* roaming register, a first means for handling signals, a second means for handling signals, at least one home interface that is arranged to receive signals from and transmit signals to the home network, the signals having a format that is the same as a signal format that occurs in the home network, and at least one guest interface that is arranged to receive signals from and transmit signals to the guest network, the signals having a format that is the same as a signal format that occurs in the guest network, the method comprising the steps of:

sending, to the roaming register from the home register in the home network, a first error message indicating that an error has occurred in the home register in the home network and that the home register lacks information relating to a position of the mobile telephone subscriber;

transforming the first error message to a second error message and sending the second error message from the roaming register to the local switching center in the guest network; and noting, in the local switching center, a need for information concerning the position of the mobile telephone subscriber.

20. The method of claim 19, further comprising the steps of:

sending, to the roaming register from the local switching center in the guest network, a first error acknowledgement which confirms that the error message has been received; and transforming the first error acknowledgement to a second error acknowledgement and sending the second error acknowledgement from the roaming register to the home register in the home network.

21. A method relating to a roaming arrangement in a telecommunications system for handling a mobile telephone subscriber, wherein the telecommunications system includes a home network that is a first standardized type of mobile telephone network, wherein the home network includes a local switching center which handles signalling to and from mobile units that are located in a cell area handled by the local switching center, and at least one guest network that is a second standardized type of mobile telephone network, and the mobile telephone subscriber has a call number which is common to both the home network and the guest network, and wherein the roaming arrangement includes *a* roaming register, a first means for handling signals, a second means for handling signals, at lest one home interface that is arranged to receive signals from and transmit signals to the home network, the signals having a format that is the same as a signal format that occurs in the home network, at least one guest interface that is arranged to receive signals from and transmit signals to the guest network, the signals having a format that is the same as a signal format that occurs in the guest network, the method comprising the steps of:

sending, from the home register in the home network to the roaming register, a first deactivating message indicating that the mobile telephone subscriber is no longer present in the guest network;

updating the roaming register to indicate that the mobile telephone subscriber is no longer present in the guest network;

transforming the first deactivation message to a second deactivation massage and sending the second deactivation message from the roaming register to the local switching center in the guest network;

deactivating data relating to the mobile telephone subscriber in the local switching center;

sending a first deactivation acknowledgement from the local switching center to the roaming register; and transforming the first deactivation acknowledgement to a second deactivation acknowledgement and sending the second deactivation acknowledgement from the roaming register to the home register in the home network.

22. A method relating to a roaming arrangement in a telecommunications system for handling a mobile telephone subscriber, wherein the system includes a home network that is a first standardized type of mobile telephone network and that includes a call switching center which is connected to a home register in the home network and to the roaming arrangement, and at least one guest network, that is a second standardized type of mobile telephone network, and the mobile telephone subscriber has a call number which is common to both the home network and the guest network, and wherein the roaming arrangement includes a roaming switching center which is connected to [the] *a* roaming register, means for handling signals, at least one home interface that is arranged to receive signals from and transmit signals to the home network, the signals having a format that is the same as a signal format that occurs in the home network, and at least one guest interface that is arranged to receive signals from and transmit signals to the guest network, the signals having a format that is the same as a signal format that occurs in the guest network, the method comprising the steps of:

calling, by a calling subscriber from a public switched telephone network unit in the telecommunications system, the mobile telephone subscriber, wherein the calling step includes the step of sending a call signal from the public switched telephone network unit to the call switching center in the home network;

sending, from the call switching center to the home register, a first query seeking a location of the mobile telephone subscriber;

sending, from the home register to the call switching center, a first response which includes a first address to the roaming switching center;

forwarding the call from the call switching center to the roaming switching center based on a first routing message which includes the first address;

sending, from the roaming switching center to the roaming register, a second query seeking the location of the mobile telephone subscriber;

sending, from the roaming register to the roaming switching center, a second response which includes a second address to a local switching center in the guest network;

forwarding the call from the roaming switching center to the local switching center based on a second routing message which includes the second address; and finalizing the call from the public switched telephone network unit to the mobile telephone subscriber by establishing a connection between the local switching center and the mobile unit.

23. A method relating to a roaming arrangement in a telecommunications system for handling a mobile telephone subscriber, wherein the system includes a home network that is a first standardized type of mobile telephone network, wherein a home register in the home network includes information relating to supplementary services that are not available to the mobile telephone subscriber, and at least one guest network that is a second standardized type of mobile telephone network, and the mobile telephone subscriber has a call number which is common to both the home network and the guest network, and wherein the roaming arrangement includes a roaming switching center which is connected to [the] *a* roaming register, means for handling signals, at least one home interface that is arranged to receive signals from and transmit signals to the home network, the signals having a format that is the same as a signal format that occurs in the home network, and at least one guest interface that is arranged to receive signals from and transmit signals to the guest network, the signals having a format that is the same as a signal format that occurs in the guest network, the method comprising the steps of:

sending, from the mobile unit to the roaming register via a local switching center in the guest network, a first handling request which includes information indicating how the mobile telephone subscriber wishes to handle a supplementary service;

transforming the first handling request to a second handling request and sending the second handling request from the roaming register to the home register in the home network; and handling the supplementary service in the home register in the home network in accordance with the information.

24. The method of claim 23, further comprising the steps of:

sending, from the home register in the home network to the roaming register, a first handling acknowledgement which acknowledges handling of the supplementary service in accordance with the information; and transforming the first handling acknowledgement to a second handling acknowledgement and sending the second acknowledgement from the roaming register to the mobile unit via the local switching center.

25. A method relating to a roaming arrangement in a telecommunications system for handling a mobile telephone subscriber, wherein the system includes a home network that is a first standardized type of mobile telephone network, wherein a home register in the home network and a local switching center include information relating to supplementary services that are available to the mobile telephone subscriber, and at least one guest network that is a second standardized type of mobile telephone network, and the mobile telephone subscriber has a call number which is common to both the home network and the guest network, and wherein the roaming arrangement includes a roaming switching center which is connected to [the] *a* roaming register, means for handling signals, at least one home interface that is arranged to receive signals from and transmit signals to the home network, the signals having a format that is the same as a signal format that occurs in the home network, and at least one guest interface that is arranged to receive signals from and transmit signals to the guest network, the signals having a format that is the same as a signal format that occurs in the guest network, the method comprising the steps of:

sending, from the home register in the home network to the roaming register, a first change message indicating that a change of supplementary service has taken place;

transforming the first change message to a second change message and sending the second change message from the roaming register to the local switching center in the guest network;

noting the supplementary service change in the local switching center in the guest network;

sending, to the roaming register from the local switching center in the guest network, a first change acknowledgement which acknowledges that the change has been implemented; and transforming the first change acknowledgement message to a second change acknowledgement message and sending the second change acknowledgement message from the roaming register to the home register in the home network.

26. A method relating to a roaming arrangement in a telecommunications system for handling a mobile telephone subscriber, wherein the system includes a home network that is a first standardized type of mobile telephone network, wherein a home register in the home network and a local switching center include information relating to supplementary services that are available to the mobile telephone subscriber, and at least one guest network that is a second standardized, type of mobile telephone network, and the mobile telephone subscriber has a call number which is common to both the home network and the guest network, and wherein the roaming arrangement includes a roaming switching center which is connected to [the] *a* roaming register, means for handling signals, at least one home interface that is arranged to receive signals from and transmit signals to the home network, the signals having a format that is the same as a signal format that occurs in the home network, and at least one guest interface that is arranged to receive signals from and transmit signals to the guest network, the signals having a format that is the same as a signal format that occurs in the guest network, the method comprising the steps of:

sending, to the roaming register from the home register in the home network, a first error message indicating that an error has occurred in the home register in the home network and that the home register lacks information relating to a position of the mobile telephone subscriber;

transforming the first error message to a second error message and sending the second error message from the roaming register to the local switching center in the guest network; and noting, in the local switching canter, a need for information concerning the position of the mobile telephone subscriber.

27. The method of claim 26, further comprising the steps of:

sending, to the roaming register from the local switching center in the guest network a first error acknowledgement which confirms that the error message has been received; and transforming the first error acknowledgement to a second error acknowledgement and sending the second error acknowledgement from the roaming register to the home register in the home network.

28. A method relating to a roaming arrangement in a telecommunications system for handling a mobile telephone subscriber, wherein the system includes a home network that is a first standardized type of mobile telephone network and that includes a local switching center which handles signalling to and from mobile units that are located in a cell area handled by the local switching center, and at least one guest network that is a second standardized type of mobile telephone network, and the mobile telephone subscriber has a call number which is common to both the home network and the guest network, and wherein the roaming arrangement includes a roaming switching center which is connected to [the] *a* roaming register, means for handling signals, at least one home interface that is arranged to receive signals from and transmit signals to the home network, the signals having a format that is the same as a signal format that occurs in the home network, at least one guest interface that is arranged to receive signals from and transmit signals to the guest network, the signals having a format that is the same as a signal format that occurs in the guest network, the method comprising the steps of:

sending, from the home register in the home network to the roaming register, a first deactivation message indicating that the mobile telephone subscriber is no longer present in the guest network;

updating the roaming register to indicate that the mobile telephone subscriber is no longer present in the guest network;

transforming the first deactivation message to a second deactivation message and sending the second deactivation message from the roaming register to indicate the local switching center in the guest network;

deactivating data relating to the mobile telephone subscriber in the local switching center;

sending a first deactivation acknowledgement from the local switching center to the roaming register; and transforming the first deactivation acknowledgement to a second deactivation acknowledgement and sending the second deactivation acknowledgement from the roaming register to the home register in the home network.

29. The roaming arrangement of claim 9, wherein the home network includes at least one first call switching center for receiving a call from a calling subscriber to the mobile telephone subscriber;

the first signal handling means includes a first roaming switching center which is connected to the home network via a third [siggnalling] *signalling* interface in the home interface between the roaming switching center and the call switching center in the home network;

the first roaming switching center is also connected to the guest network via a second roaming switching center included in the second signal handling means and via a fourth signalling interface in the guest interface between the second roaming switching center and the local switching center in the guest network;

the third signalling interface is of a same type as a standardized interface between a first call switching center and the local switching center in the home network; and the fourth signalling interface is of a same type as a standardized interface between the local switching center and a second call switching center in the guest network.

30. The roaming arrangement of claim 1, wherein at least one of the home network and the guest network includes at least one satellite-based air interface.

31. The roaming arrangement of claim 2, wherein at least one of the home network and the guest network includes at least one satellite-based air interface.

32. The roaming arrangement of claim 3, wherein at least one of the home network and the guest network includes at least one satellite-based air interface.

33. The roaming arrangement of claim 4, wherein at least one of the home network and the guest network includes at least one satellite-based air interface.

34. The roaming arrangement of claim 5, wherein at least one of the home network and the guest network includes at least one satellite-based air interface.

35. The roaming arrangement of claim 6, wherein at least one of the home network and the guest network includes at least one satellite-based air interface.

36. The roaming arrangement of claim 7, wherein at least one of the home network and the guest network includes at least one satellite-based air interface.

37. The roaming arrangement of claim 8, wherein at least one of the home network and the guest network includes at least one satellite-based air interface.

38. The [roam] *roaming* arrangement of claim 29, wherein at least one of the home network and the guest network includes at least one satellite-based air interface.

* * * * *